United States Patent
Eto et al.

(10) Patent No.: US 8,654,620 B2
(45) Date of Patent: Feb. 18, 2014

(54) WRITE POWER ADJUSTMENT METHOD AND INFORMATION RECORDING METHOD

(71) Applicant: Hitachi Consumer Electronics Co., Ltd., Tokyo (JP)

(72) Inventors: Soichiro Eto, Tokyo (JP); Koichi Watanabe, Hachioji (JP); Harukazu Miyamoto, Higashimurayama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/871,293

(22) Filed: Apr. 26, 2013

(65) Prior Publication Data

US 2013/0235711 A1    Sep. 12, 2013

Related U.S. Application Data

(62) Division of application No. 13/515,654, filed as application No. PCT/JP2010/053299 on Mar. 2, 2010, now Pat. No. 8,472,293.

(30) Foreign Application Priority Data

Dec. 16, 2009    (JP) .................... 2009-284670

(51) Int. Cl.
    *G11B 7/00*    (2006.01)
(52) U.S. Cl.
    USPC ............... 369/47.53; 369/47.51; 369/59.11
(58) Field of Classification Search
    USPC ................................. 369/47.53
    See application file for complete search history.

(56) References Cited

U.S. PATENT DOCUMENTS 7,751,288 B2    7/2010 Eto et al.
8,050,158 B2 *  11/2011 Eto et al. ............. 369/47.51

(Continued)

FOREIGN PATENT DOCUMENTS

| JP | 2005-209287 | 8/2005 |
| JP | 2007-1726932 | 7/2007 |
| JP | 2007-334922 | 12/2007 |
| WO | WO2008/013077 A1 | 1/2008 |

OTHER PUBLICATIONS

System Description Blu-ray Disc Rewritable Format, Part 1, Basic Format Specification, Version1.02, Blu-ray Founders, Jun. 2004, pp. 197-200. Chapter 12/Annex7.

*Primary Examiner* — Van Chow
(74) *Attorney, Agent, or Firm* — Antonelli, Terry, Stout & Kraus, LLP.

(57) ABSTRACT

In write power adjustment for an optical disc having a plurality of information storage layers, data of trial writing is varied by the influence of layers other than a target layer. It is difficult, therefore, to determine optimal write power. A modulation M[m] is obtained from a reproduction signal amplitude of a signal subjected to the trial writing performed with use of write powers Pw[m] (m being an integer) of a plurality of kinds. At least an optimum write power intercept Pint_opt is determined by fitting a relation between the Pw[m] and the M[m] by a modulation characteristic formula $M = Masy \times (1-(Pint-Pasy)/(Pw-Pasy))$ having an asymptotic modulation Masy, a write power intercept Pint, and an asymptotic write power Pasy as parameters. Approximation accuracy by the fitting and/or quality of the trial writing signal are evaluated with use of at least the M[m], the modulation characteristic formula, and the Pint_opt. An optimum write power Pw_opt is calculated by performing a specified operation at least with use of the Pint_opt.

3 Claims, 8 Drawing Sheets

(56) References Cited

U.S. PATENT DOCUMENTS

| | | |
|---|---|---|
| 2005/0128911 A1* | 6/2005 | Miyashita et al. ......... 369/47.53 |
| 2005/0163008 A1 | 7/2005 | Mamiya et al. |
| 2007/0053264 A1* | 3/2007 | Yu .............................. 369/47.53 |
| 2007/0121461 A1* | 5/2007 | Kobayashi et al. ........ 369/59.11 |
| 2007/0286042 A1* | 12/2007 | Eto et al. .................... 369/47.53 |
| 2009/0323485 A1 | 12/2009 | Sasaki et al. |
| 2011/0002204 A1 | 1/2011 | Eto et al. |
| 2011/0317532 A1 | 12/2011 | Eto et al. |

* cited by examiner

Calculation error of optimum write power

Calculation error of optimum write power

WRITE POWER ADJUSTMENT METHOD AND INFORMATION RECORDING METHOD

RELATED APPLICATION

This application is a divisional application of application Ser. No. 13/515,654, filed Jun. 13, 2012, which is a U.S. national phase application under 35 U.S.C. §371 of International Application No. PCT/JP2010/053299, filed Mar. 2, 2010, which claims priority of Japanese Patent Application No. 2009-284670 filed Dec. 16, 2009.

TECHNICAL FIELD

The present invention relates to a power adjustment method for adjusting write power and an information recording method for performing the write power adjustment method.

BACKGROUND ART

Today, CDs (Compact Discs), DVDs (Digital Versatile Discs), BDs (Blu-ray Discs) and the like are produced on a commercial basis and are widely used as optical discs that are optical information recording media. The optical discs include various types such as a ROM (Read Only Memory) type which allows reproduction only, an R (Recordable) type which allows data addition, and an RE (Rewritable) type which allows information alteration. Information recording and reproduction in the optical disc is performed by an optical disc drive which is an optical information recorder irradiating the optical disc with a laser beam. Information recording is achieved by changing irradiation power of the laser beam and forming a mark having modified optical properties on a data layer of the optical disc. Information reproduction is achieved by irradiating the optical disc with a laser beam whose power is lower than that of mark formation on the data layer of the optical disc and detecting a difference in reflected light amount at every irradiation position.

The optimum write power used in information recording is different depending on optical disc types and manufacturers of the optical discs, and so the drive needs to set the optimum write power in accordance with the kinds of the optical discs. However, even the optical discs of the same kind are different from each other in the optimum write power due to production variations, and sometimes optimal recording may not be achieved if the same write power is used. Even in the case of using the same optical disc, sometimes optimal recording may not be achieved if the same set power is used due to power variations among drives. Accordingly, each drive is configured to perform trial writing in a specified area of the optical disc prior to optical disc recording and to adjust the optimal write power corresponding to the optical disc.

As a method for adjusting write power by using trial writing, there has been proposed, for example, a method for BD-RE using a relation between write power and modulation, which is disclosed in Non Patent Literature 1 that is a document of specifications for BD-RE.

In this method, an optimum write power Pw_opt is calculated with use of a relation between a write power Pw and a modulation M as well as predetermined parameters including a specified write power Pind, a coefficient target value κ and a coefficient ρ. These parameters are pre-recorded onto a control area of the optical disc. First, a specified signal is recorded onto a specified area of the optical disc with use of a plurality of types of write powers Pw[m] (m being an integer) in the vicinity of the specified write power Pind. By reproducing the recorded signal, a modulation M[m] which is a value obtained by dividing the amplitude of the reproduction signal by a higher envelope level is associated with the write power Pw[m] and acquired. Next, a relation between an evaluation value M[m]×Pw[m] and the write power Pw[m] is subjected to linear approximation in a specified range having arbitrary Pw[m] as a center, and a write power value at the point where the approximation straight line intersects a Pw axis (at the point where M×Pw becomes zero) is calculated as a write power threshold Pthr[m]. In the relation between a target write power Ptarget[m]=κ×Pthr[m] obtained by multiplying the calculated Pthr[m] by the coefficient target value κ and the write power Pw[m], a write power Pw which satisfies Ptarget=Pw is determined as an optimal target write power Ptarget_opt, and a value obtained by multiplying the optimal target write power Ptarget_opt by the coefficient ρ is determined as an optimum write power Pw_opt. The square brackets ([ ]) in the above description are used as a suffix for distinguishing each value when one index (e.g., Pw and M) has a plurality of values. The suffix may also be expressed with a character for collectively indicating these values (E.g., m). The index without the brackets (e.g., Pw in comparison to Pw[m] and M in comparison to M[m]) is a generalized expression of each index. This way of expression applies hereafter.

According to the method described above, each drive can set the optimum write power for each optical disc, and therefore optimal recording can be implemented. Since the write power adjustment method disclosed in Non Patent Literature 1 is a model performed with use of the coefficient target value κ, this write power adjustment method is hereinafter referred to as a κ model.

Another write power adjustment method using the relation between write power Pw and modulation M, which is different from the aforementioned method, is disclosed in Patent Literature 1.

In this method, an optimum write power Pw_opt is calculated by using a ratio α=Pw_opt/Pth between an optimum write power Pw_opt and a write power threshold Pth which are predetermined parameters. First, a specified signal is recorded onto a specified area of the optical disc with use of write powers Pw[m] (m being an integer) of a plurality of types. A modulation M[m] corresponding to each write power Pw[m] is acquired by reproducing the recorded signal. Next, write power correction values Pc[n] (n being an integer) of a plurality of kinds are set, and Pc[n] which makes a relation between an evaluation value M[m]×(Pw[m]−Pc[n]) and corrected write power (Pw[m]−Pc[n]) closest to a straight line is determined as an optimum write power correction value Pc_opt. A relation between an evaluation value M[m]×(Pw[m]−Pc_opt) and a corrected write power (Pw[m]−Pc_opt) is subjected to linear approximation, and the corrected write power value at the point where the approximation straight line intersects the axis (Pw−Pc_opt) (at the point where M×(Pw−Pc_opt) becomes zero) is calculated as a corrected write power threshold Pth'. A write power threshold Pth=Pth'+Pc_opt is calculated by using the calculated Pth', and the calculated Pth is multiplied by a coefficient α to determine an optimum write power Pw_opt=α×Pth.

When this method is used, it becomes possible to determine optimal reproduction power with high precision and to thereby implement optimal recording for an optical disc having a curvilinear relation between M×Pw and Pw and for a medium having a modulation which uniformly changes depending on the state and reproduction condition of the optical disc (having a magnification which uniformly changes in all the measurement points).

CITATION LIST

Patent Literature

Patent Literature 1: JP 2007-334922 A

Non Patent Literature

Non Patent Literature 1: System Description Blu-ray Disc Rewritable Format, Part 1, Basic Format Specifications, Version 1.02

SUMMARY OF INVENTION

Technical Problem

In some optical discs, however, the relation between the write power and the modulation in trial writing is randomly changed (changed without correlation at each measurement point). In some cases, optimum write power cannot appropriately be determined by the above-stated write power adjustment method.

As an example, the case of a multilayered optical disc having two or more data layers will be described. In the multilayered optical disc, a plurality of data layers are laminated in the volume direction, and recording and reproduction in each layer are performed by focusing irradiation light on each layer. At this time, not only a target layer abut also other layers are irradiated with incident light, so that a difference in states of other layers, such as a difference between an unrecorded state and a recorded state, influences recording and reproduction. FIG. 5 in Patent Literature 1 shows an example of a multilayered optical disc having two data layers, in which the modulation is uniformly changed (changed in magnification) depending on whether another layer is in the unrecorded state or the recorded state. To cope with the variation of the modulation, it is described that using the write power adjustment method disclosed in Patent Literature 1 makes it possible to determine optimum write power with high precision. However, variations of the write power and the modulation in multilayered optical discs are not limited to the variation described in FIG. 5 in Patent Literature 1.

For example, a case may be considered in which the unrecorded state and the recorded state mixedly exist in other layers (unrecorded/recorded mixed state). In this case, effective power of the light which transmits other layers and irradiates a target layer is changed under the influence of other layers. Therefore, the effective power at the time of recording is changed depending on recording positions. Moreover, since reflected light detected at the time of reproduction consists of superposed light beams which reflected and transmitted other layers, the reflected light is influenced by other layers. Accordingly, the reflected light at the time of reproduction also is changed depending on reproduction positions. Therefore, when the states of other layers are not uniform in a trial writing area in write power adjustment, the relation between the write power and the modulation which are obtained by trial writing exhibits that the modulation is randomly changed (changed without correlation at each measurement point).

FIG. 1 shows an example of a result obtained by measuring the relation between the write power and the modulation in the case where all other layers are in the unrecorded state and in the case where the unrecorded/recorded states mixedly exist in a multilayered optical disc having four data layers. Hereinafter, the relation between the write power and the modulation is referred to as a modulation characteristic. The modulation characteristic in the case where other layers are in the unrecorded/recorded mixed state is different from the modulation characteristic in the case where other layers are in the unrecorded state in the point that the modulation is randomly changed at each write power and the influence of the trial writing positions is notable.

This variation exercises an influence on the calculation accuracy of optimum write power in write power adjustment. FIG. 2 shows a relation between write a power Pw and a target write power Ptarget which can be obtained when write power adjustment of κ model is performed based on the result of FIG. 1. An intersection between the plot of FIG. 2 and Ptarget=Pw is the point of an optimal target write power Ptarget_opt for use in calculation of optimum write power. In the case where the unrecorded state and the recorded state mixedly exist in other layers, Ptarget_opt is calculated which is different from that in the case where all other layers are in the unrecorded state. This indicates that optimum write power cannot appropriately be determined. FIG. 3 shows a result obtained by executing the κ-model write power adjustment method one hundred times with use of the optical disc identical to that of FIG. 1 in the state where other layers in the trial writing are in the unrecorded/recorded mixed state and obtaining calculation errors between optimum write power and appropriate optimum write power calculated in each execution. The frequency of achieving accurate write power adjustment with a calculation error of 0% is low and the calculation error distributes up to −10% at the worst. This indicates that the κ-model write power adjustment method cannot provide sufficient write power adjustment to the variation shown in FIG. 1. This is because the optimum write power is calculated with use of a differential value of the modulation characteristic obtained by trial writing in the κ-model write power adjustment method, and therefore errors tend to occur for local variations.

FIG. 4 shows a result obtained by executing the write power adjustment method described in Patent Literature 1 one hundred times with use of the optical disc of FIG. 1 in the state where other layers in the trial writing are in the unrecorded/recorded mixed state and obtaining calculation errors between resultant optimum write power and appropriate optimum write power in the manner similar to the above description. Although the distribution of calculation error in FIG. 4 is narrower than that in FIG. 3, the calculation error distributes up to ±4%. This indicates that write power adjustment cannot be implemented with sufficient precision.

Variations represented by FIG. 1 relate to the positions of respective measurement points on the optical disc, and there is no correlation between the respective measurement points. It can be considered, therefore, that a simple method for removing the influence of FIG. 1 is to sufficiently increase the measurement points in the range where the write power adjustment is performed. However, an actual trial writing area on the optical disc is limited. If a considerable portion of the area is used for trial writing of one write power adjustment, then it may become impossible to perform the subsequent write power adjustment. Therefore, a method capable of performing write power adjustment with high precision and with use of the amount of trial writing generally equal to the amount in the present circumstances is desired.

The present invention provides, to solve the aforementioned problems, a method for evaluating quality of data for use in write power adjustment, a write power adjustment method capable of determining optimum write power with high precision, an information recording medium for storing information for use in the write power adjustment method, and an information recording/reproducing apparatus for performing the write power adjustment method.

Solution to Problem

In order to solve the above-stated problems, in the write power adjustment of the present invention, a specified signal is recorded with write powers Pw[m] (m being an integer) of a plurality of kinds, the recorded signal is reproduced to obtain modulation M[m] corresponding to each write power Pw[m], a measured relation between the write power Pw[m] and the modulation M[m] is fitted by Formula (1) shown below, optimum values of an asymptotic modulation Masy (asymptotic modulation), a write power intercept Pint (write power intercept), and an asymptotic write power Pasy (asymptotic write power) which are parameters in Formula (1) are calculated, and a specified operation is performed with use of the calculated optimum values Masy_opt, Pint_opt, and Pasy_opt to determine an optimum write power Pw_opt.

[Expression 1]

$$M = Masy\left(1 - \frac{Pint - Pasy}{Pw - Pasy}\right) \quad (1)$$

Further, the quality of measurement data is evaluated with use of an error or/and a correlation between a modulation M (Pw[m]) obtained by substituting the calculated optimum values Masy_opt, Pint_opt, and Pasy_opt into Formula (1) and the measured modulation M[m], so that optimum write power adjustment with higher precision is implemented. In this case, if an index used for the fitting in Formula (1) is different from an index used for evaluation of the quality of measurement data, the precision of optimum write power adjustment is enhanced.

FIG. 5 is a schematic view showing relations among a measured relation between a write power Pw and a modulation M (modulation characteristic), a function of Formula (1) as a result of fitting, an optimal asymptotic modulation Masy_opt, an optimal asymptotic write power Pasy_opt, and an optimum write power intercept Pint_opt. In this case, the asymptotic modulation Masy represents an asymptotic value of the modulation in Formula (1), which is a saturation value of the modulation estimated from the measured modulation characteristic. The asymptotic write power Pasy represents an asymptotic value of the write power in the case where the modulation is ± infinite in Formula (1). Further, the write power intercept Pint represents write power in the case where the modulation becomes zero in Formula (1), i.e., an intersection between Formula (1) and the write power axis. It is the power estimated from the measured modulation characteristic at which recording is started. Thus, Formula (1) is a function characterized by Masy, Pint, and Pasy and is a formula which approximately expresses the relation of the modulation M with the write power Pw.

In the write power adjustment method of the present invention, fitting of the measured modulation characteristic is accurately performed by using the Formula (1). Therefore, variations at measurement points shown in FIG. 1 can be equalized and high-precision write power adjustment is implemented. Further in this write power adjustment method, an optimum write power Pw_opt is calculated with use of the power (Pint) at which recording is started. As a result, it becomes possible to appropriately predict the relation between write power and the size of marks and thereby high-precision write power adjustment can be implemented.

Advantageous Effects of Invention

According to the write power adjustment method of the present invention, optimum write power adjustment can be performed with high precision on the optical disc in which the relation between the write power and the modulation is randomly changed.

DESCRIPTION OF EMBODIMENTS

Hereinafter, a write power adjustment method as an embodiment of the present invention will be described with reference to the drawings.

In the present embodiment, an optical disc is used as an information recording medium and an optical disc apparatus is used as an information recording/reproducing apparatus. A description is first given of the configuration of these apparatuses and then a description is given of a write power adjustment method as the present embodiment performed in the optical disc apparatus which is an information recording/reproducing apparatus.

Figure 1:
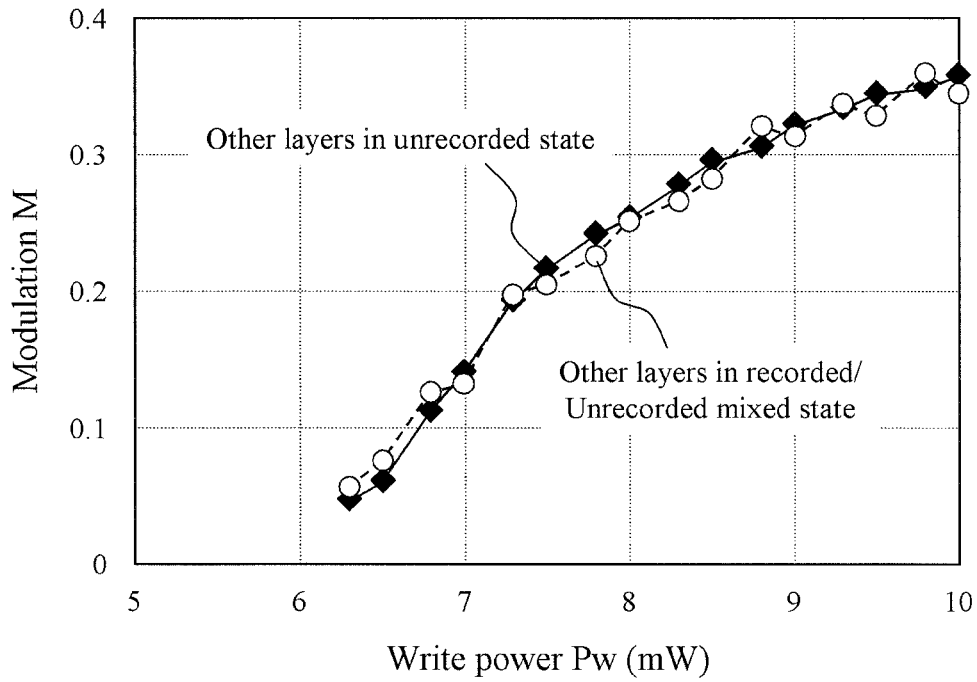
FIG. 1 is an exemplary view showing a difference in modulation characteristic in trial writing on a multilayered optical disc, the difference between in the case where other layers are in an unrecorded state and in the case where other layers are in a recorded/unrecorded mixed state.
Figure 2:
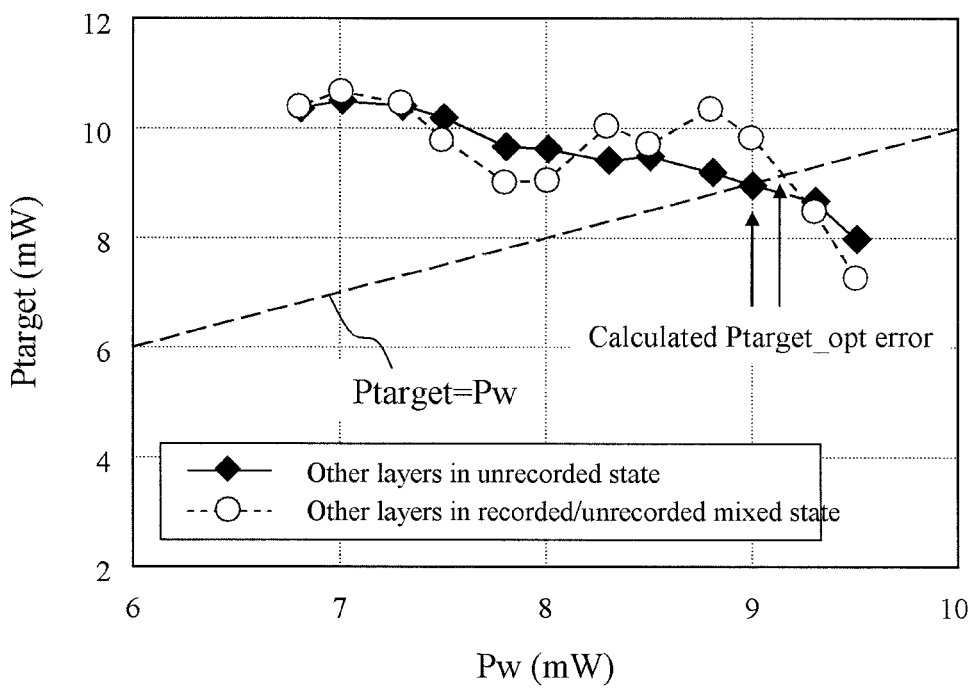
FIG. 2 is an exemplary view showing a difference in relation between Pw and target write power Ptarget in the κ-model write power adjustment in the multilayered optical disc, the difference between in the case where other layers are in the unrecorded state and in the case where other layers are in the recorded/unrecorded mixed state.

The optical disc used in the embodiment is a four-layer optical disc used in FIG. 1. When recording is made in other layers other than a pertinent layer, variations in modulation characteristic described in Technical Problem and shown in FIG. 1 occur in the optical disc. Write power adjustment in each embodiment is performed when other layers of the optical disc are in the unrecorded/recorded mixed state. In short, the modulation characteristic in each write power adjustment is expressed as the variation in modulation from the case where other layers are in the unrecorded state as shown in FIG. 1.

Embodiment 1

Figure 6:
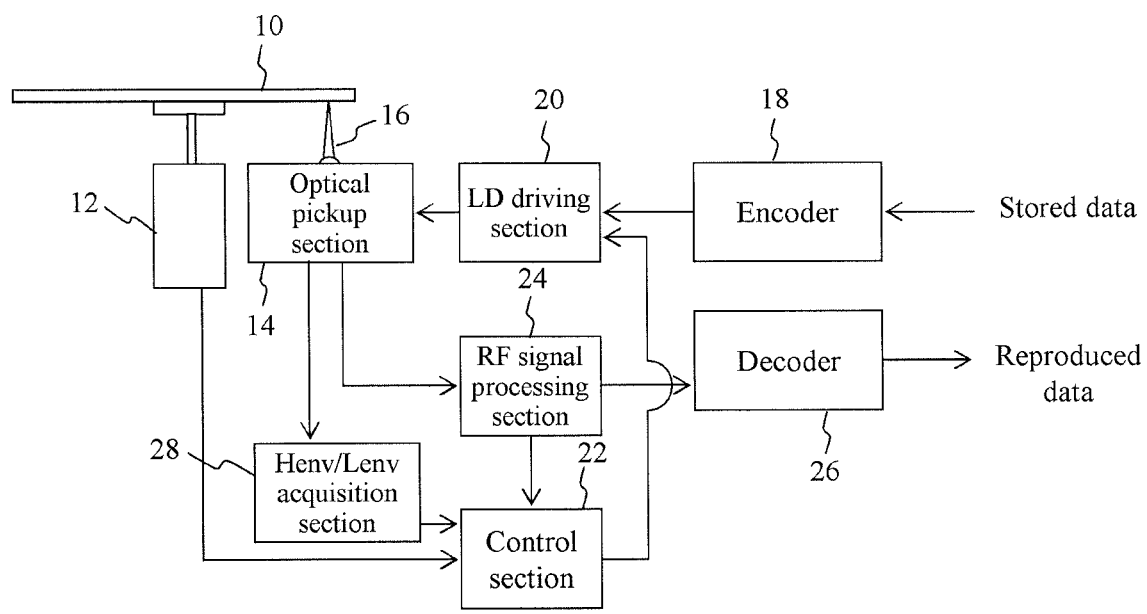
FIG. 6 is an exemplary view showing the configuration of principle components of an optical disc apparatus according to an embodiment of the present invention.

FIG. 6 is a block diagram showing the configuration of principle components of an optical disc apparatus used in the embodiment of the present invention. CLV (Constant Linear Velocity) control or CAV (Constant Angular Velocity) control is performed on the optical disc 10 with a spindle motor 12. An optical pickup section 14 is provided facing the optical disc 10. When a laser beam 16 with write power is emitted from a laser diode (LD), a signal is recorded onto the optical disc 10, while when a laser beam with reproduction power is emitted from the LD, the recorded signal is read. In the case where the optical disc 10 is a rewritable optical disc, a laser beam with erase power (reproduction power<erase power<write power) is emitted from the LD to erase the recorded signal. The recorded signal may either irreversibly change the material of a recording film of the optical disc 10 with the laser beam of write power to form a pit, or reversibly or irreversibly change the state of the recording film from a crystal state into an amorphous state through heating and rapid cooling to record a signal. In the present embodiment, either of the recording methods may be employed. In the latter case, erasing is achieved by returning the amorphous state to the crystal state through irradiation of erase power.

For recording a signal, a recording signal is encoded in an encoder 18 and is fed to an LD driving section 20. The LD driving section 20 generates a driving signal based on the encoded recording signal and feeds the driving signal to an LD in the optical pickup section 14 where the signal is recorded. A write power value in the LD driving section 20 is determined by a control signal from a control section 22. Prior to recording of the signal, the control section 22 performs trial writing with write power of a plurality of kinds in a trial writing area of the optical disc 10 and determines optimum write power based on the trial writing signal.

At the time of data reproduction, an RF signal outputted from the optical pickup section 14 is fed to an RF signal processing section 24. The RF signal processing section 24, which has devices such as an RF amplifier, an equalizer, a binarization section and a PLL section, processes the RF signal with these devices and feeds the processed signal to a decoder 26. The decoder 26 decodes the signal based on a binarized RF signal and a synchronous clock reproduced in the PLL section and outputs the decoded signal as reproduction data. A Henv/Lenv acquisition section 28 amplifies a reproduction signal outputted from the optical pickup section 14, then calculates a Higher Envelope (Henv) and a Lower Envelope (Lenv) of the reproduction signal and feeds them to the control section 22 for signal quality evaluation. A reproduction RF signal from the RF signal processing section 24 which is an RF signal acquisition system is also amplified and then fed to the control section 22 for signal quality evaluation. There are other circuits for data recording and reproduction, such as a circuit for generating a tracking error signal and a focus error signal to control a focus servo and a tracking servo, and a circuit for reproducing a wobble signal formed on the optical disc 10 and using the signal for address demodulation or revolving speed control. Since these circuits are similar to those in conventional technology, description thereof will be omitted herein.

The control section 22 determines optimum write power based on the quality of a reproduction signal of trial writing sent from the RF signal processing section or from the Henv/Lenv acquisition section. More specifically, the control section 22 calculates a modulation M[m] (m being an integer) based on the signal from the RF signal processing section or the Henv/Lenv acquisition section, determines an optimum write power Pw_opt based on optimum values Masy_opt, Pint_opt, and Pasy_opt which are obtained by fitting a relation of the modulation M[m] corresponding to write powers Pw[m] of a plurality of kinds by Formula (1), and feeds it to the LD driving section 20. Further in some cases, the control section 22 evaluates the quality of trial writing data with use of an error or/and a correlation between a modulation M[m] calculated based on the signal and a modulation M(Pw[m]) obtained by substituting the optimum values Masy_opt, Pint_opt, and Pasy_opt which are parameters of Formula (1) into Formula (1), and determines whether or not the determined optimum write power Pw_opt is appropriate.

Figure 7:
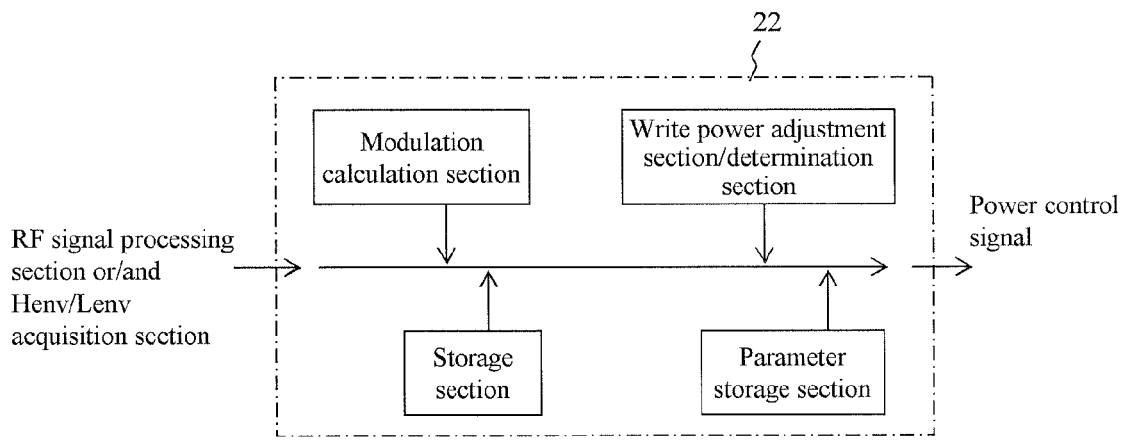
FIG. 7 is an exemplary view showing a control section of the optical disc apparatus according to the embodiment of the present invention.

FIG. 7 is a schematic block diagram of the control section 22 in FIG. 6. The control section 22 is constituted from a microcomputer to be more precise and is configured to include a modulation calculation section, a write power adjustment section/determination section, a storage section and a parameter storage section as functional blocks. Specifically, the modulation calculation section and the write power adjustment section/determination section may be constituted from a single CPU, and the storage section and the parameter storage section may be constituted from a RAM.

A signal from the RF signal processing section or/and the Henv/Lenv acquisition section is fed to the control section 22 and inputted into the modulation calculation section. The modulation calculation section calculates a modulation M[m] (m being an integer) based on the fed signal. In write power adjustment, the calculated modulation M[m] is associated with each write power Pw[m] and stored in the storage section. The write power adjustment section/determination section determines an optimum write power Pw_opt based on optimum values Masy_opt, Pint_opt, and Pasy_opt which are obtained when the relation between the write power Pw[m] and the modulation M[m], which is a stored modulation characteristic, is fitted by the Formula (1), and the obtained parameter is stored in the parameter storage section. The write power adjustment section/determination section may also evaluate the quality of trial writing data with use of an error or/and a correlation between the modulation M[m] calculated based on the signal and the modulation M (Pw[m]) obtained by substituting the optimum values Masy_opt, Pint_opt, and Pasy_opt which are parameters of Formula (1) into Formula (1).

A description will be hereinafter be given of the result obtained by performing the write power adjustment by using the above-described optical disc apparatus.

First, the control section 22 sets write powers Pw[m] of a plurality of kinds in accordance with specified conditions. For example, the control section 22 reads an average optimum write power of the disc pre-stored in the optical recording/reproducing apparatus, or reproduces and reads an average optimum write power pre-stored in an information control area of the optical disc, then sets the write powers Pw[m] of a plurality of kinds based on the average optimum write power. The control section 22 records a signal of a specified pattern such as a repeated pattern of marks and spaces of a longest signal for use in the optical disc in a specified area of the optical disc such as a trial writing area of the optical disc with use of the set Pw[m].

A signal recorded with each Pw[m] is reproduced to measure a higher envelope (Henv[m]) and a lower envelope (Lenv[m]) of the reproduction signal amplitude, and an operation of M[m]=(Henv[m]−Lenv[m])/Henv[m] is performed to calculate a modulation M[m] corresponding to each write power Pw[m]. The calculated modulation M[m] is associated with the write power Pw[m] and stored in the storage section in FIG. 7.

Next, the write power adjustment section in FIG. 7 performs fitting of the measured relation between the write power Pw[m] and the modulation M[m] by Formula (1) and determines optimum values Masy_opt, Pint_opt, and Pasy_opt, which are parameters of Formula (1). The fitting is performed so that, for example, the parameters Masy, Pint, and Pasy are independently changed, and the optimum values Masy_opt, Pint_opt, and Pasy_opt of the parameters are determined so as to minimize an error between Formula (1) and the measurement point (Pw[m], M[m]) by using, for example, a least square method.

Next, a specified operation is performed with use of the determined optimum values Masy_opt, Pint_opt, and Pasy_opt to determine an optimum write power Pw_opt. For example, the optical disc apparatus reads and acquires a ratio τ=Pw_opt/Pint_opt between the optimum write power intercept Pint_opt and the optimum write power Pw_opt of the optical disc pre-stored in the storage section of the optical disc, or reads and acquires a ratio τ=Pw_opt/Pint_opt between the optimum write power intercept Pint_opt and the optimum write power Pw_opt of the optical disc pre-stored in a control area of the optical disc. The optical disc apparatus then calculates the optimum write power Pw_opt by Pw_opt=τ×Pint_opt.

Figure 3:
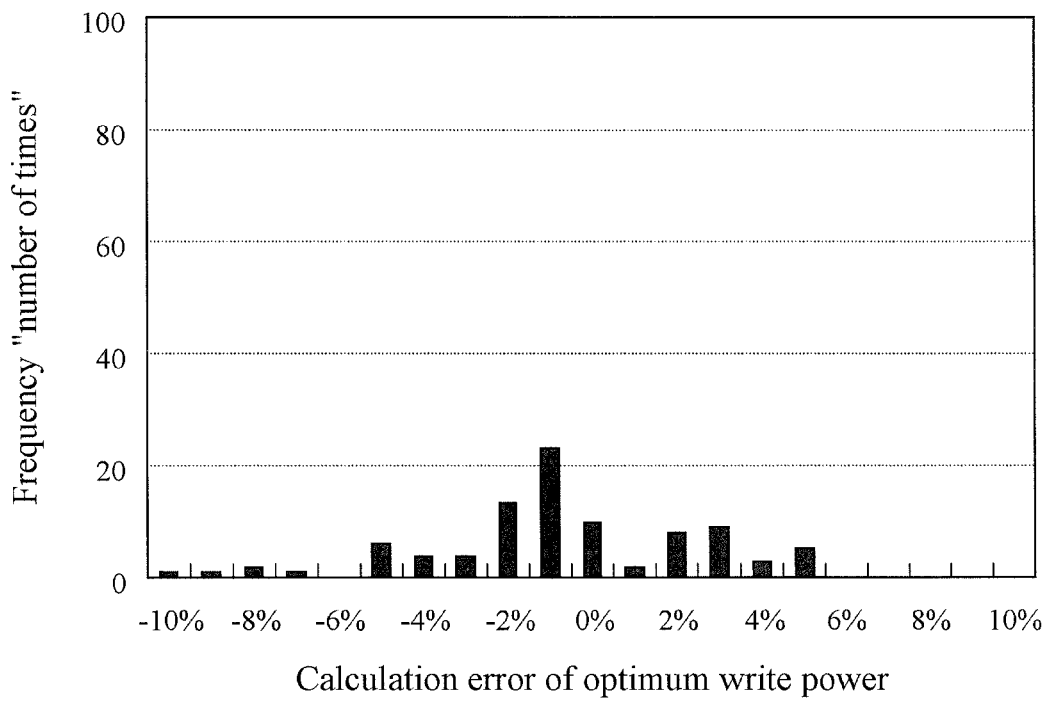
FIG. 3 is an exemplary view showing a relation between calculated optimum write power error and frequency when the κ-model write power adjustment is performed one hundred times in an optical disc whose modulation characteristic varies.
Figure 4:
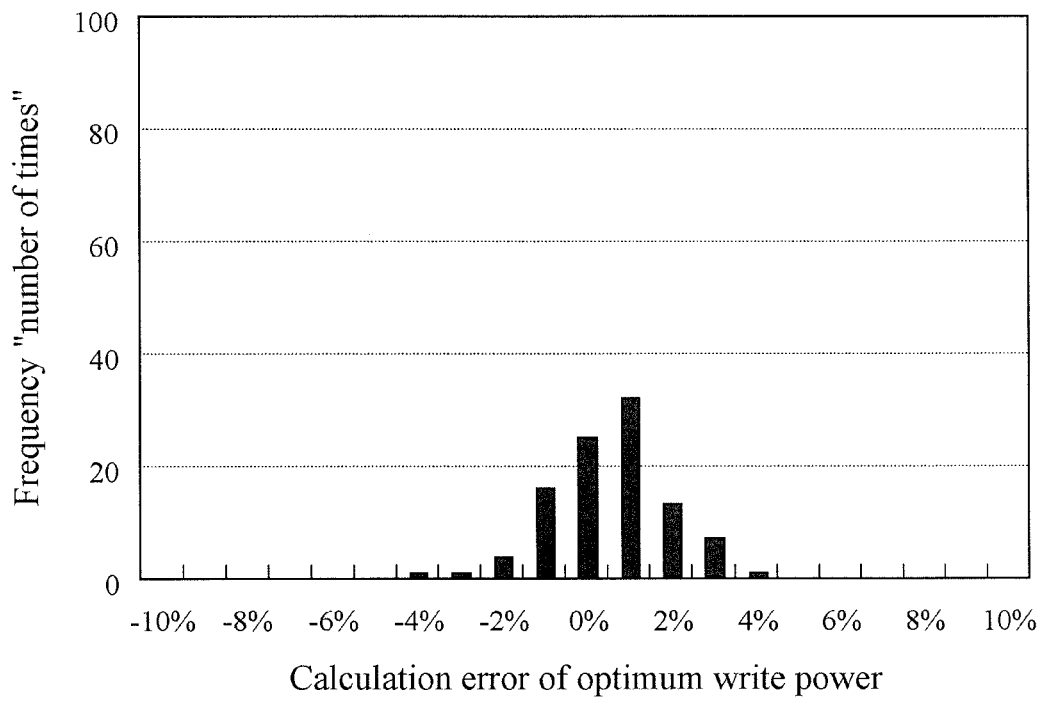
FIG. 4 is an exemplary view showing a relation between calculated optimum write power error and frequency when the write power adjustment stated in Patent Literature 1 is performed one hundred times in the optical disc whose modulation characteristic varies.
Figure 5:
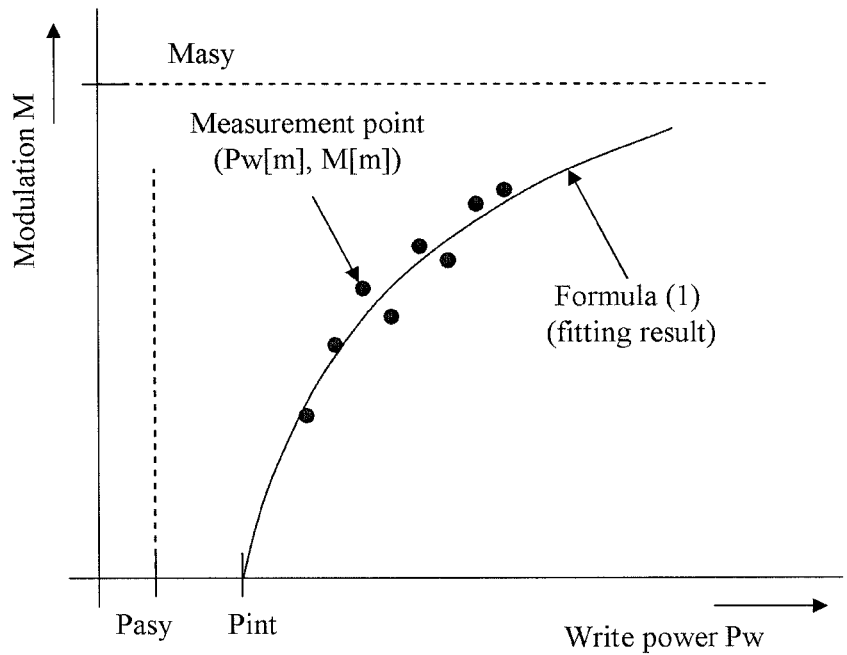
FIG. 5 is an exemplary view explaining the definition of parameters Masy, Pint, and Pasy in Formula (1) for use in fitting the modulation characteristic by the Formula (1) of the present invention.
Figure 8:
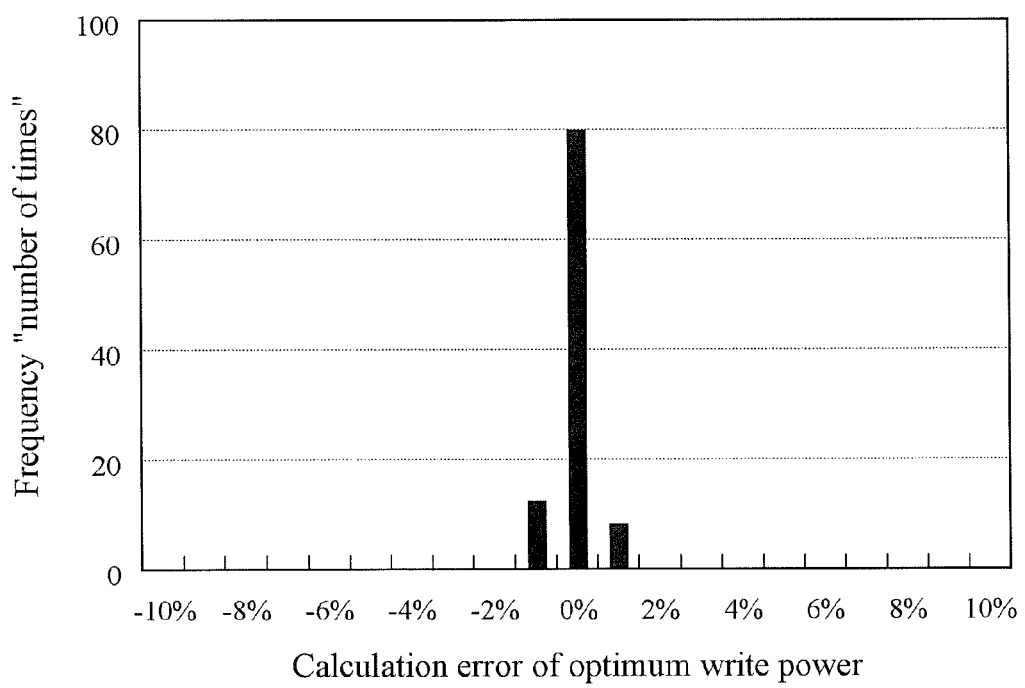
FIG. 8 is an exemplary view showing a relation between calculated optimum write power error and frequency when the write power adjustment of the present invention is performed one hundred times in the optical disc whose modulation characteristic varies.

FIG. 8 shows calculation error of the optimum write power Pw_opt obtained when write power adjustment is performed one hundred times with use of the aforementioned write power adjustment method. The calculation error in FIG. 8 is smaller than that in FIGS. 3 and 4 and the adjustment frequency is highest at the calculation error of 0%. It can be confirmed, therefore, that applying the write power adjustment of the present invention makes it possible to suppress variations in the modulation characteristic shown in FIG. 1 and to implement precise write power adjustment. In the write power adjustment method of the present invention, the measured modulation characteristic is fitted by Formula (1) so that variations at the respective measurement points shown in FIG. 1 are equalized for all the measurement points used for write power adjustment. This indicates that random variations can sufficiently be equalized only with use of the present measurement points without increasing the number of the measurement points for trial writing. As is clear from the above description, the write power adjustment method of the present invention can reduce the influence of effectual variations in write power and variations in modulation at the time of reproduction depending on the position of the measurement points and can thereby implement write power adjustment with high precision.

The ratio τ (=Pw_opt/Pint_opt) between the optimum write power Pw_opt and the optimum write power intercept Pint_opt of the optical disc used herein is a value unique to a medium and is allotted, for example, for every type of optical discs. The ratio τ may be pre-installed in a disc when the disc is manufactured, i.e., when a substrate is manufactured. In the case of BDs for example, a value κ, which is a value unique to each BD, is stored in a wobble together with address information and the like when the BDs are manufactured. Therefore, the value τ may also be recorded in each disc in a similar manner. When the value τ is not included in the information possessed by the disc, then the value τ may be calculated form associated information. Alternatively, considering that the value τ is allotted for every type of optical discs, the optical disc may predict the ratio τ corresponding to the conceivable (probable) type of the optical disc, and if the optical disc has data concerned, it may determine the value τ on the basis of the optical disc type. If there are parameters unique to the medium for use in write power adjustment other than the value τ, the parameters may be so stored that the optical disc apparatus can acquire in the same manner as in the foregoing description.

Thus, the control section 22 ends the write power adjustment. It was confirmed that appropriate recording was achieved by performing recording onto the recording disc with use of the determined optimum write power Pw_opt.

Embodiment 2

In the present embodiment, a description will be given of the case where the method for setting the write powers Pw[m] of a plurality of kinds stated in Embodiment 1 is changed. Since unchanged portions of the embodiment are similar to those in Embodiment 1, the description thereof will be omitted in this embodiment.

Setting of the write powers Pw[m] of a plurality of kinds is achieved by, for example, reading in advance the range of setting the write power for trial writing recorded in the control area of the optical disc and/or stored in the storage section of the optical disc apparatus. It is also possible to read, for example, a specified write power Pind used in the κ-model write power adjustment method and to set the write powers Pw[m] for trial writing in the same way as in the κ model.

Since the write powers Pw[m] are appropriately set in either case, it is possible to perform write power adjustment in the same way as in Embodiment 1.

The method of the present embodiment is also applicable to subsequent embodiments, and similar effects can be obtained in each of the embodiments.

Embodiment 3

In the present embodiment, a description will be given of the case where the signal recorded with the write power Pw[m] in Embodiments 1 and 2 is changed. Since unchanged portions of the embodiment are similar to those in Embodiment 1 and 2, the description thereof will be omitted in this embodiment.

For the signal recorded with the write power Pw[m], it is possible to use, for example, a random pattern of a modulation code and an isolated signal pattern in the optical disc. It is also possible to use a pattern including a signal longer than the longest signal of the modulation code in the optical disc. This pattern is longer than the longest code used in a user data area. For example, since a 1-7 modulation is used in BDs, a 9T consecutive pattern which goes against the 1-7 modulation rule corresponds to this pattern. In any case, when the signal has the same pattern at all the write powers Pw[m], the modulation characteristic of the medium can be acquired. Therefore, the write power adjustment similar to that in Embodiments 1 and 2 is achieved.

When a pattern including a signal longer than the longest signal of the modulation code in the optical disc is used, the precision of the write power adjustment is enhanced in some cases. This is because in the case of a disc using a signal in which the mark or space level of the longest signal does not reach a saturation level, the trial writing performed with a signal longer than the longest signal increase the reliability of the modulation data for use in write power adjustment.

The method of the present embodiment is also applicable to subsequent embodiments, and similar effects can be obtained in each of the embodiments.

Embodiment 4

In the present embodiment, a description will be given of the case where the method for fitting the measured modulation characteristic in Embodiments 1 to 3 is changed. Since unchanged portions of the embodiment are similar to those in Embodiments 1 to 3, the description thereof will be omitted in this embodiment.

In the present embodiment, a reference asymptotic write power Pasy_ref and a reference write power intercept Pint_ref predetermined for every medium are acquired in advance from the control area of the optical disc and/or the storage section of the optical disc apparatus, and the modulation characteristic measured based on the acquired information is fitted by Formula (1) to determine parameter optimum values Masy_opt, Pint_opt, and Pasy_opt.

The reference asymptotic write power Pasy_ref and the reference write power intercept Pint_ref which are predetermined for every medium are parameters unique to the optical disc. These parameters are predetermined by the following methods.

In a state of the optical disc to be referred to, e.g., in the state where all other layers in the multilayered optical disc are in the unrecorded state, trial writing is performed in the range of the write power with which write power adjustment is conducted and a reference modulation characteristic is acquired thereby. The acquired reference modulation characteristic is fitted by Formula (1). For example, the parameters Masy, Pint, and Pasy of Formula (1) are independently changed and parameter optimum values Masy_opt, Pint_opt, and Pasy_opt are determined so as to minimize an error between the reference modulation characteristic and Formula (1) with use of, for example, the least square method. The determined optimum write power intercept Pint_opt is set as a reference write power intercept Pint_ref and the optimal asymptotic write power Pasy_opt is determined as a reference asymptotic write power Pasy_ref.

Figure 9:
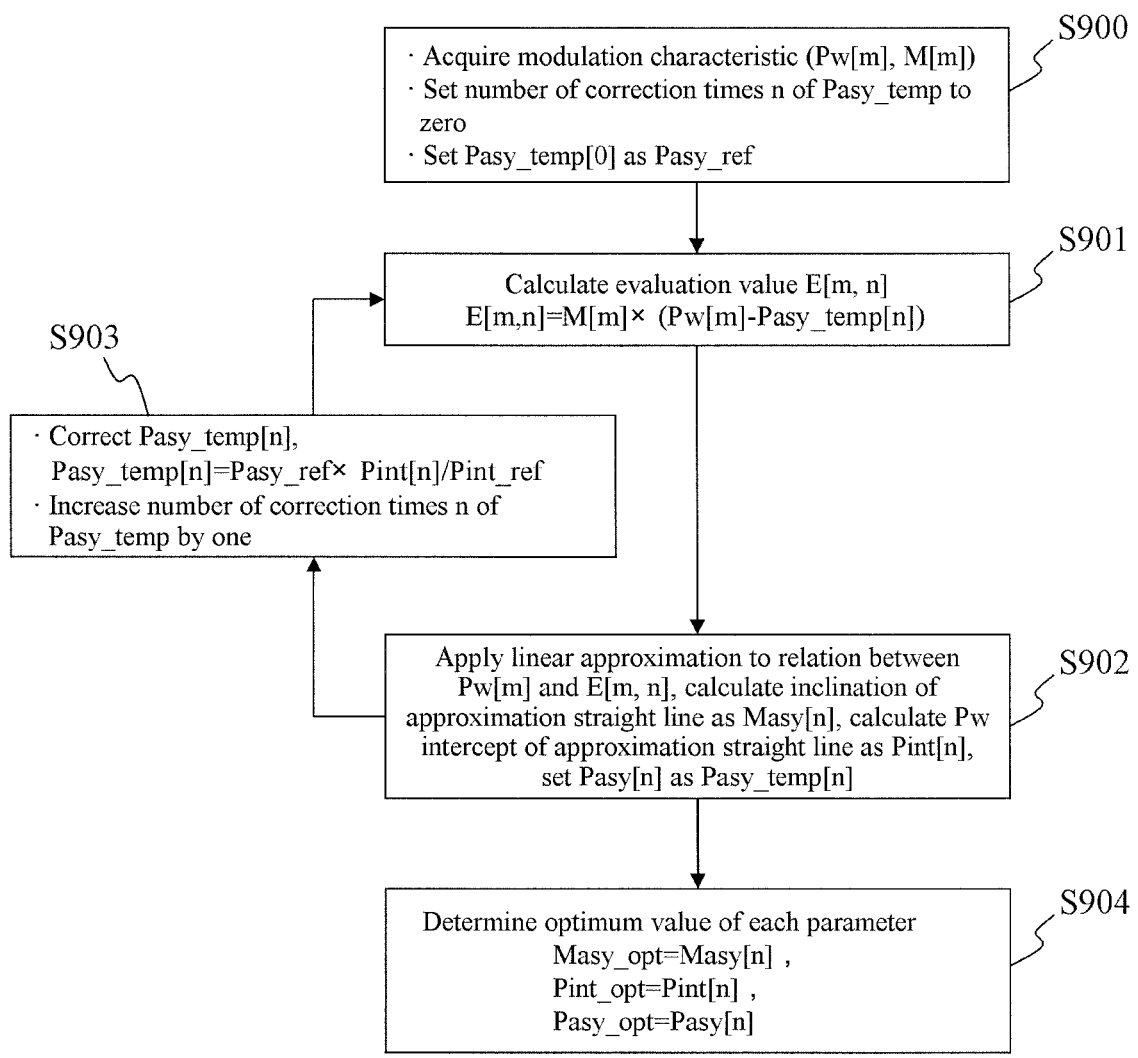
FIG. 9 is an exemplary flow chart showing procedures of a write power adjustment method with use of a reference asymptotic write power Pasy_ref and a reference write power intercept Pint_ref.

Next, a description will be given of the method for determining parameter optimum values Masy_opt, Pint_opt, and Pasy_opt by fitting the measured modulation characteristic by Formula (1) with use of the reference asymptotic write power Pasy_ref and the reference write power intercept Pint_ref according to the flow in FIG. 9.

First, a modulation characteristic (Pw[m], M[m]) is acquired and the number of correction times n of Pasy_temp for use in fitting the modulation characteristic is set at zero. A zero-time corrected Pasy_temp[0] is defined as Pasy_ref (S900). At subsequent S901, an evaluation value E[m, n] is calculated by E[m, 0]=M[m]×(Pw[m]−Pasy_temp[0]). Then at S902, linear approximation is applied to a relation between the write power Pw[m] and the evaluation value E[m, 0], an inclination of the approximation straight line is set as Masy [0], a Pw intercept of the approximation straight line is set as Pint[0], and Pasy[0] is set as Pasy_temp [0]. In this case, the result obtained by fitting the modulation characteristic is M=Masy_opt×{1−(Pint_opt−Pasy_opt)/(Pw−Pasy_opt)}. If Pasy_opt=Pasy_temp [0] (if correction of Pasy_temp is not needed), the procedures from S900 to S902 are equivalent to linear approximation of M×(Pw−Pasy_temp[0])=Masy_opt× (Pw−Pint_opt). As a consequence, Masy_opt=Masy[0] and Pint_opt=Pint[0], and therefore the results in the case of n=0 can be determined as respective optimum values at S904. However, the correction of Pasy_temp being not needed signifies that the modulation characteristic in trial writing is identical to the reference modulation characteristic. In many instances, therefore, Pasy_opt is not equal to Pasy_ref. In that case, the procedure shifts to S903 specified times to correct Pasy_temp. More specifically, at S902 and then at S903, Pasy_temp[n] is calculated by Pasy_temp[n]=Pasy_ref×Pint [n]/Pint_ref, and the number of correction times n of Pasy_temp is increased by one. Then the steps from S901 to S902 are executed again. By repeating correction of Pasy_temp, Pasy_temp[n] becomes closer to Pasy_opt, and as a result, respective parameters Masy[n], Pint[n], and Pasy [n] become closer to optimum values, by which the precision of write power adjustment is also enhanced.

Figure 10:
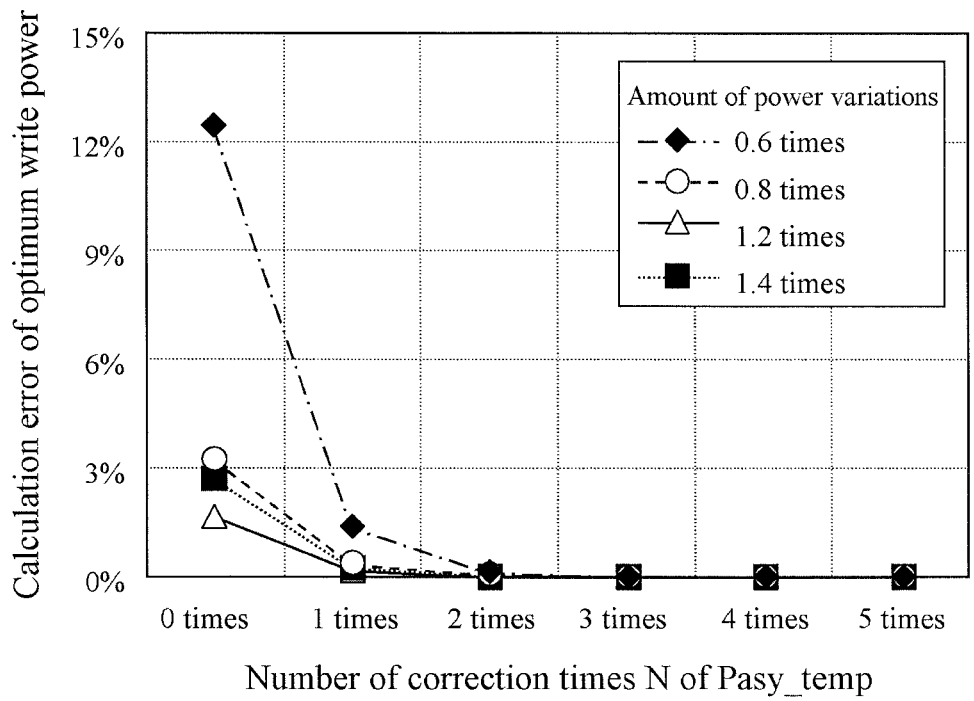
FIG. 10 is an exemplary view showing a relation between the number of correction times n of Pasy_temp and a calculated average values of errors of optimum write power in write power adjustment method with use of the reference asymptotic write power Pasy_ref and the reference write power intercept Pint_ref.

FIG. 10 shows a relation between the number of correction times n of Pasy_temp and calculation error of optimum write power. Shown in the drawing is the case where the amount of variations in a write power Pw direction of the modulation characteristic in the write power adjustment is in the range of 0.6 times to 1.4 times larger than the amount of variations in the reference modulation characteristic. Even in the case of the power variation of 0.6 time which has the largest calculation error when the number of correction times of Pasy_temp is zero, the calculation error becomes 1% or less when the number of correction times is two. Therefore, when the fitting method according to the flow of FIG. 9 is used, it becomes possible to appropriately calculate the optimum values of the parameters of Formula (1) and to thereby determine optimum write power with high precision.

In the above procedures, n-time corrected Pasy_temp[n] is used, Pint[n] is calculated based on the result obtained by applying linear approximation to the write power and the evaluation value, and n+1 time corrected Pasy_temp [n+1] is calculated by Pasy_temp [n+1]=Pasy_ref×Pint[n]/Pint_ref. Since this formula can be deformed to Pasy_ref/Pint_ref=Pasy_temp [n+1]/Pint[n], repeating correction of Pasy_temp is equivalent to correcting the parameter so that a ratio between Pasy [n+1] and Pint[n] approaches a ratio in the reference modulation characteristic (ratio between Pasy_ref and Pint_ref). Therefore, in this method, the above step is equivalent to performing fitting while correcting Pasy by utilizing that the modulation characteristic acquired by trial writing has a curve form similar to that of the reference modulation characteristic. Thus, placing restrictions in advance on the function form at the time of fitting makes it possible to prevent fitting performed with the function of a wrong form and to prevent calculation of wrong optimum write power. Moreover, this method does not include the operation of distributing parameters Masy, Pint, and Pasy of Formula (1) to search for optimum values but involves only the repetition of the same operation. Therefore, the method allows high-precision write power adjustment with simple configuration. Further, the result shown in FIG. 10 indicates that optimum write power is calculated with sufficiently high precision even when the optimum write power is calculated with the number of correction times of Pasy_temp being set at zero if the amount of power variations is small. Therefore, the write power adjustment method without correction of Pasy_temp is also possible. This makes it possible to execute the write power adjusting operation with simpler configuration. In addition, the reference write power intercept Pint_ref also becomes unnecessary.

Figure 11:
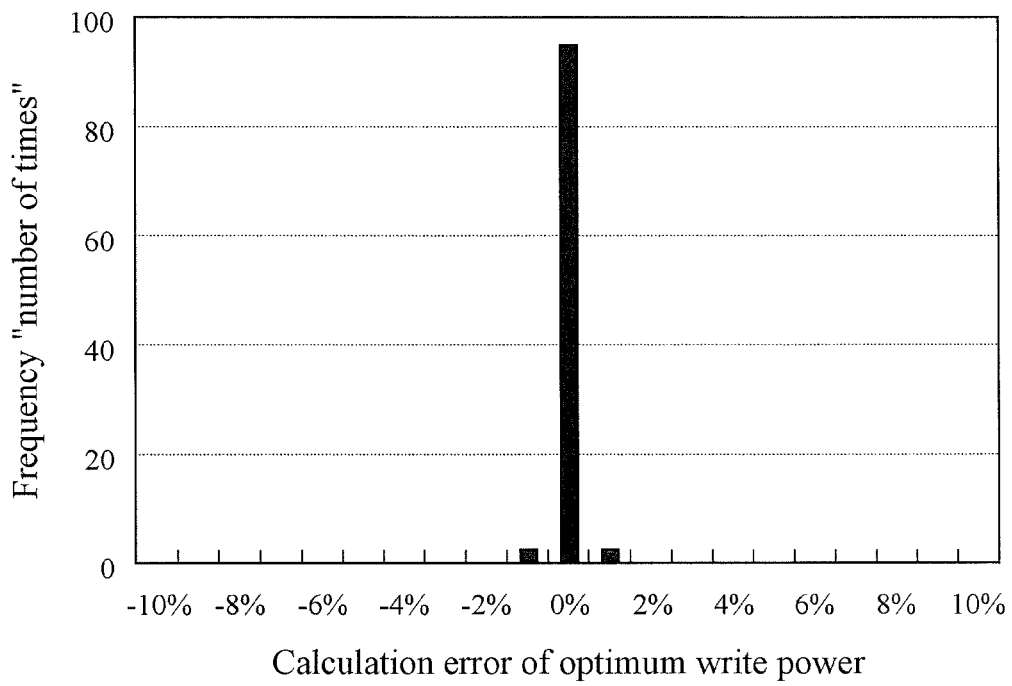
FIG. 11 is an exemplary view showing a relation between calculated optimum write power error and frequency obtained when the write power adjustment of the present invention with use of the reference asymptotic write power Pasy_ref and the reference write power intercept Pint_ref is performed one hundred times in the optical disc whose modulation characteristic varies.

FIG. 11 shows calculation accuracy of the optimum write power Pw_opt obtained when write power adjustment by the write power adjustment method of the present embodiment was performed one hundred times with the number of correction times of Pasy_temp being set at two. The calculation error shown in the drawing is still smaller than that in FIG. 8. Therefore, in the write power adjustment method of the present embodiment, it can be confirmed that optimum write power can be calculated with further high precision as compared with the procedures used in FIG. 8 by fixing in advance the features of the modulation characteristic of the optical disc before fitting is performed.

The method of the present embodiment is also applicable to subsequent embodiments, and similar effects can be obtained in each of the embodiments.

Embodiment 5

In the present embodiment, a description will be given of the case where the method for fitting the measured modulation characteristic in Embodiments 1 to 4 is changed. Since unchanged portions of the embodiment are similar to those in Embodiments 1 to 4, the description thereof will be omitted in this embodiment.

In the present embodiment, a ratio ν=Pint_opt/Pasy_opt between the optimal asymptotic write power Pasy_opt and the optimum write power intercept Pint_opt which is predetermined for every medium is obtained in advance from the control area of the optical disc and/or the storage section of the optical disc apparatus, and the modulation characteristic measured based on the obtained information is fitted by Formula (1) to determine parameter optimum values Masy_opt, Pint_opt, and Pasy_opt.

Since the ratio ν which is predetermined for every medium is a parameter unique to the optical disc, the ratio is determined, for example, as a ratio ν=Pint_opt/Pasy_opt between the optimal asymptotic write power Pasy_opt and the optimum write power intercept Pint_opt, which is calculated with use of the reference modulation characteristic of the optical disc, in the same way as in the calculation of the parameter unique to the optical disc in Embodiment 4.

Next, the method for fitting the measured modulation characteristic by Formula (1) with use of the ratio ν between Pint and Pasy and determining parameter optimum values Masy_opt, Pint_opt, and Pasy_opt will be described below.

Each measurement point (Pw[m], M[m]) of the measured modulation characteristic is substituted into Formula (1). At this point, if Pint is erased by using the ratio ν, then the following Formula (2) is obtained.

[Expression 2]

$$M\left(\frac{Pw - Pasy}{Pw - \nu Pasy}\right) = Masy \tag{2}$$

Since Masy on the right-hand side is constant, Pasy is determined so that the left-hand side of Formula (2) is closest to constant, i.e., so that a standard deviation α on the right-hand side is minimized for example. The determined Pasy is determined as an optimal asymptotic write power Pasy_opt, an average value on the right-hand side at that time is determined as an optimal asymptotic modulation Masy_opt, and ν×Pasy_opt is determined as an optimum write power intercept Pint_opt. When the optimum write power Pw_opt is determined by using this method, the calculation error generated when the write power adjustment is performed one hundred times is as small as in the case of Embodiments 1 to 4. Therefore, it can be confirmed that high-precision write power adjustment can be performed.

Since the ratio ν between Pint and Pasy is thus made constant in this write power adjustment method, fitting is performed on the basis that the measured modulation characteristic and the reference modulation characteristic share the same curve form as in the foregoing write power adjustment method. As a result, it becomes possible to prevent fitting with a wrong function and to implement write power adjustment with high precision for the modulation variation shown in FIG. 1 in the same way as in the write power adjustment method in Embodiment 4. Moreover, three parameters of Formula (1) are reduced to two parameters as a result of the fitting conducted with the ratio ν between Pint and Pasy provided thereto. Further, since the form of Formula (2) makes it possible to retrieve Pasy which makes the left-hand side constant, it suffices to retrieve the optimum value for one parameter in this method, which allows high-precision write power adjustment with simple configuration.

The method of the present embodiment is also applicable to subsequent embodiments, and similar effects can be obtained in each of the embodiments.

Embodiment 6

In the present embodiment, a description will be given of the case where the fitting method used in fitting the relation between the write power and the modulation by Formula (1) in Embodiments 1 to 5 is changed. A description will particularly be made by taking as an example the method for fitting the reference modulation characteristic and for determining the parameters unique to the medium such as values of Pint_ref, Pasy_ref, and ν in Embodiments 4 to 5. Since unchanged portions of the embodiment are similar to those in Embodiments 4 to 5, the description thereof will be omitted in the present embodiment.

With respect to the measurement point (Pw[m], M[m]) of the reference modulation characteristic, an evaluation value M[m]×(Pw[m]−Pasy) having the asymptotic write power Pasy as a variable is considered. Pasy which minimizes an error between the Pw[m] versus evaluation value and the approximation straight line is calculated, i.e., Pasy which minimizes a square error sum is calculated for example. The calculated Pasy is determined as an optimal asymptotic write power Pasy_opt. In short, considering that the square error sum equals to an error of an evaluation value axis and that the approximation straight line equals to M×(Pw−Pasy)=Masy×(Pw−Pint) for example, the square error sum S is given by the following formula.

[Expression 3]

$$S = \sum_m \{M[m] \times (Pw[m] - Pasy) - Masy \times (Pw[m] - Pint)\}^2 \quad (3)$$

In this case, Pasy which minimizes the value S in Formula (3) is the optimal asymptotic write power Pasy_opt.

Next, an inclination obtained when linear approximation is applied to a relation between the evaluation value M[m]×(Pw[m]−Pasy_opt) and the write power Pw[m] with use of Pasy_opt is set as an optimal asymptotic modulation Masy_opt, and the value of write power Pw which reduces the evaluation value to zero is determined as an optimum write power intercept Pint_opt. In short, Masy in the approximation straight line M×(Pw−Pasy_opt)=Masy×(Pw−Pint) with use of the Pasy_opt is determined as an optimal asymptotic modulation Masy_opt, and Pint therein is determined as an optimum write power intercept Pint_opt.

Since parameter values unique to the medium determined by this method are identical to the values in Embodiments 4 to 5, the parameters for use in fitting in write power adjustment can appropriately be provided in the same way as in Embodiments 4 to 5.

The method of the present embodiment is also applicable to subsequent embodiments, and similar effects can be obtained in each of the embodiments. Further, the method of the present embodiment is applicable not only to the case of fitting the reference modulation characteristic by Formula (1) but also to any of the cases in which the relation between the write power Pw and the modulation M is fitted by Formula (1). The method is also applicable to the case where the modulation characteristic of the trial writing is fitted by Formula (1) in write power adjustment.

Embodiment 7

In the present embodiment, a description will be given of the case where the state of the optical disc used as a reference in determining the parameters unique to the medium in Embodiments 4 to 6 is changed. Since unchanged portions of the embodiment are similar to those in Embodiments 4 to 6, the description thereof will be omitted in this embodiment.

In the present embodiment, the state in which other layers are in the unrecorded/recorded mixed state is used as the optical disc state to be referred. With reference to this state, the parameters unique to the medium are determined. In the state of the optical disc to be referred in the present embodiment, the reference modulation characteristic is obtained and fitted in the same way as in Embodiments 4 to 6. Obtained Pint_ref and Pasy_ref were different from the values in Embodiments 4 to 6. However, as for the value ν, the same value as in Embodiment 5 was calculated. The ratio ν is a ratio between Pint_ref and Pasy_ref, and the parameter which determines the curve form of the modulation characteristic unique to the medium is a write power ratio between two points determined on the modulation characteristic represented by ν. This indicates that the ratio is constant even when the reference modulation characteristic varies as long as the medium is the same.

With use of the calculated Pint_ref, Pasy_ref, and ν, write power adjustment was performed with the fitting methods according to Embodiments 4 to 6. As a result, the same results as in Embodiments 4 to 6 were obtained. This indicates that precise write power adjustment can be performed when the parameter unique to the medium is calculated with the reference modulation characteristic being changed.

The method of the present embodiment is also applicable to subsequent embodiments, and similar effects can be obtained in each of the embodiments.

Embodiment 8

In the present embodiment, a description will be given of the case where the method for calculating the optimum write power Pw_opt with use of the optimum value Masy_opt, Pint_opt, and Pasy_opt in Embodiments 1 to 7 is changed. Since unchanged portions of the embodiment are similar to those in Embodiments 1 to 7, the description thereof will be omitted in this embodiment.

For example, when a coefficient ρ and a ratio τ' between the optimal target write power Ptarget_opt and the optimum write power intercept Pint_opt in the κ-model write power adjustment method are acquired in advance, the optimum write power Pw_opt is calculated with Pw_opt=ρ×τ'×Pint_opt.

For example, when the reference write power intercept Pint_ref and the reference optimum write power Pw_ref are acquired in advance, the optimum write power Pw_opt is calculated with Pw_opt=Pw_ref/Pint_ref×Pint_opt.

For example, when the coefficient ρ, the specified write power Pind, and the reference write power intercept Pint_ref in the κ-model write power adjustment method are acquired in advance, the optimum write power Pw_opt is calculated with Pw_opt=ρ×Pind/Pint_ref×Pint_opt.

In any of the above-stated cases, the ratio between the optimum write power intercept Pint_opt and the optimum write power Pw_opt can be obtained by conversion from the parameters acquired in advance, so that precise calculation of the optimum write power Pw_opt is achieved. Therefore, it is appreciated that the parameters used for calculation of Pw_opt from Pint_opt may be any combination of parameters that allow conversion of the ratio between Pint_opt and Pw_opt.

The method of the present embodiment is also applicable to subsequent embodiments, and similar effects can be obtained in each of the embodiments.

Embodiment 9

In the present embodiment, a description will be given of the case where evaluation indexes used to acquire the optimum values of parameters for use in fitting the relation between the write power Pw and the modulation M by Formula (1) in Embodiments 1 to 8 are changed. Since unchanged portions of the embodiment are similar to those in Embodiments 1 to 8, the description thereof will be omitted in this embodiment.

Examples of the evaluation indexes include the sum of distances, the sum of errors, a standard error σ, a correlation coefficient r, and a determination coefficient R2. These indexes may be used to determine the optimum values of parameters which minimize the sum of distances between Formula (1) and the measurement points for example. Here, a write power axis and a modulation axis may be normalized with the maximum values of Pw[m] and M[m] at the measurement points, and the optimum values of parameters Masy, Pint, and Pasy of Formula (1) may be determined so that the sum of distances between Formula (1) and the measurement points is minimized. Moreover, optimum values of the parameters in Formula (1) may be determined by using, for example, a standard error σ between Formula (1) and the measurement points, a correlation coefficient r, and/or a determination coefficient R2. In this case, the determination coefficient R2 is expressed with the following Formula (4). The parameters are determined to be optimum when the determination coefficient R2 is closest to 1.

[Expression 4]

$$R^2 = 1 - \frac{\sum_{m=1}^{n} \{M[m] - M(Pw[m])\}^2}{\sum_{m=1}^{n} \left(M[m] - \frac{1}{n}\sum_{l=1}^{n} M[l]\right)^2} \quad (4)$$

In Expression 4, n represents the number of measurement points for use, and M(Pw) represents a modulation obtained by Formula (1).

The correlation coefficient r is expressed with the following Formula (5) or Formula (6). The parameters are determined to be optimum when a square value of the correlation coefficient r is closest to 1.

[Expression 5]

$$r = \frac{n\sum_{m=1}^{n}\{M[m] \times M(Pw[m])\} - \left(\sum_{m=1}^{n} M[m]\right) \times \left(\sum_{m=1}^{n} M(Pw[m])\right)}{\sqrt{\left(n\sum_{m=1}^{n}(M[m])^2 - \left(\sum_{m=1}^{n} M[m]\right)^2\right)\left(n\sum_{m=1}^{n}\{M(Pw[m])\}^2 - \left(\sum_{m=1}^{n} M(mPw[m])\right)^2\right)}} \quad (5)$$

$$r = \frac{\sum_{m=1}^{n}\left\{\left(M[m] - \frac{1}{n}\sum_{l=1}^{n} M[l]\right)\left(M(Pw[m]) - \frac{1}{n}\sum_{l=1}^{n} M(Pw[l])\right)\right\}}{\sqrt{\left(\sum_{m=1}^{n}\left(M[m] - \frac{1}{n}\sum_{l=1}^{n} M[l]\right)^2 \sum_{m=1}^{n}\left(M(Pw[m]) - \frac{1}{2}\sum_{l=1}^{n} M(Pw[l])\right)^2\right)}} \quad (6)$$

In Expression 5, n represents the number of measurement points for use, and M(Pw) represents a modulation obtained by Formula (1).

As long as the fitting precision is compared by using the same index, the precision of write power adjustment is not degraded no matter which index is used. Therefore, as long as the index is predetermined, any index may be used for evaluating the error. In this embodiment, the indexes corresponding to the measured modulation M[m] and the modulation M(Pw[m]) of Formula (1) are described. When the values compared at the time of fitting are, for example, an evaluation value calculated from the measurement point and an approximation straight line, the aforementioned indexes may be applied.

The method of the present embodiment is also applicable to subsequent embodiments, and similar effects can be obtained in each of the embodiments.

Embodiment 10

In the present embodiment, a description will be given of the case where a fitting residual D, which is a parameter unique to the optical disc, is added to the case in which the relation between the write power Pw and the modulation M is fitted by Formula (1) in Embodiments 1 to 9. Since unchanged portions of the embodiment are similar to those in Embodiments 1 to 9, the description thereof will be omitted in this embodiment.

The fitting residual D, which is an index indicating the fitting precision at the time of fitting the modulation characteristic of the optical disc by Formula (1), is acquired in advance by reproducing the information recorded on the control area of the optical disc and/or by reading the information stored in the storage section of the optical disc apparatus. The fitting residual D to be acquired in this case is, for example, an error between the reference modulation characteristic and Formula (1) at the time of fitting the reference modulation characteristic by Formula (1). If the fitting is performed by using, for example, the least square method, the fitting residual D is a minimum value of the sum of square errors. The fitting residual D may be obtained at the same time when the parameters unique to the optical disc, which are acquired in advance before execution of the write power adjustment in Embodiments 1 to 9, are determined. Depending on the index of the fitting error, the fitting residual D may be, for example, the sum of square errors, the sum of distances, a standard deviation, a correlation coefficient, and a determination coefficient. Although the fitting residual D is determined based on the result obtained by fitting the reference modulation characteristic in the foregoing description, the fitting residual D may be a preset value which can evaluate the adequacy of the fitting. In that case, it becomes unnecessary to check the fitting residual D corresponding to the disc beforehand.

In the fitting for write power adjustment, the fitting residual D is compared with, for example, the error generated at the time of fitting the measured modulation characteristic by Formula (1). This makes it possible to implement comparison of fitting precision of the measured modulation characteristic and evaluation of the quality of the modulation characteristic, which allows confirmation that the fitting is performed appropriately. Accordingly, when the fitting precision is low, or when the quality of the modulation characteristic is poor, the write power adjustment may be redone from the step of trial writing for example.

When the fitting residual D is determined from the reference modulation characteristic, it can be determined how much the modulation characteristic of the optical disc can be fitted by Formula (1) at the time when the fitting residual D is acquired. This makes it possible to judge the optical disc which cannot otherwise be judged by application of the write power adjustment method of the present invention.

The method of the present embodiment is also applicable to subsequent embodiments, and similar effects can be obtained in each of the embodiments.

Embodiment 11

In the present embodiment, a description will be given of a method for determining the parameters, such as a ratio $\tau$ between Pint_opt and Pw_opt and a ratio $\tau'$ between Pint_opt and Ptarget_opt, for use in calculating the optimum write power Pw_opt with use of the optimum value Masy_opt, Pint_opt, and Pasy_opt in Embodiments 1 to 10.

These parameters are determined by fitting the reference modulation characteristic in the state of the optical disc to be referred by using Formula (1) in the same way as in the method for determining the parameters Pint_ref, Pasy_ref, and $\nu$, which are unique to the medium, for use in fitting in the write power adjustment of Embodiments 4 to 10.

For example, the parameters Masy, Pint, and Pasy of Formula (1) are calculated so that the sum of errors, e.g., the sum of the square errors, between the reference modulation characteristic and Formula (1) are minimized, and the calculated values are determined as Masy_opt, Pint_opt, and Pasy_opt. At this point, parameters for use in the $\kappa$ model with use of the reference modulation characteristic, such as a coefficient $\rho$, a specified write power Pind, and a target coefficient value $\kappa$, may also be determined. With use of these calculated values, the values of parameters for use in calculating Pw_opt from Pint_opt may be determined. For example, the value $\tau$ is determined as a ratio between the calculated Pint_opt and Pw_opt, and the $\tau'$ is determined as a ratio between the calculated Pint_opt and Pind. As shown in Embodiment 8, the parameters for use in calculating Pw_opt from Pint_opt vary depending on the calculation method. Therefore, the parameters necessary for each method may be determined with use of the values calculated from the reference modulation characteristic.

The parameters may be selected such that the optimum write power Pw_opt can eventually be determined by the write power adjustment as a whole. In short, when the write power adjustment method with use of the fitting method of Embodiment 4 is implemented for example, the reference write power intercept Pint_ref and the reference asymptotic write power Pasy_ref are already given as the parameters for use in the fitting. Therefore, the parameters for determining Pw_opt from Pint_opt may be any one of the specified write power Pind in the $\kappa$ model, the ratio between Pint_opt and Pw_opt, the ratio between Pasy_opt and Pw_opt, and the reference optimum write power Pw_ref.

The method for fitting the reference modulation characteristic is not limited to the methods described in this embodiment. The methods described in Embodiments 4 to 11 may also be used.

The method of the present embodiment is also applicable to subsequent embodiments, and similar effects can be obtained in each of the embodiments.

Embodiment 12

The present embodiment is for recording in advance the fixed values determined in Embodiments 1 to 11 on a specified area of the medium, such as on a DI of control data in the control area. As for the combination of Embodiments 1 to 11, any combination is acceptable.

Figure 12:
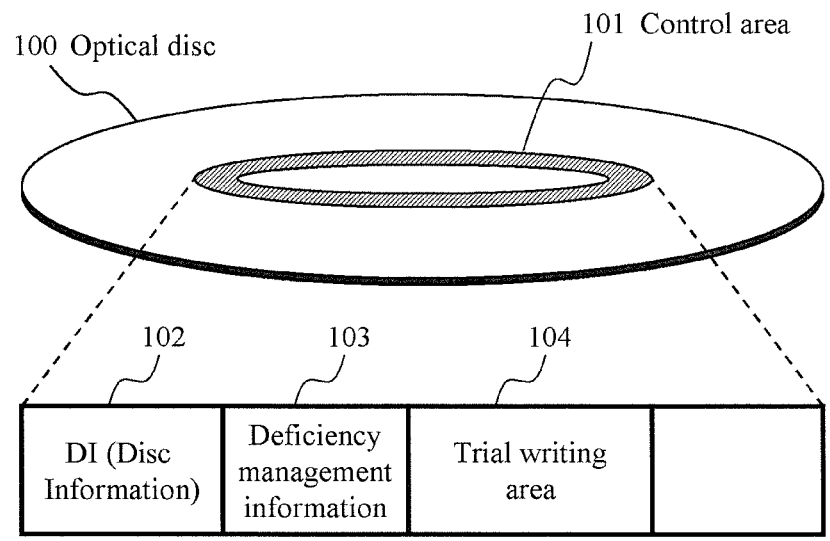
FIG. 12 is an exemplary view showing the configuration of an information recording medium of this application.

Information for use in setting the write powers Pw[m] of a plurality of kinds acquired in advance, information for use in fitting, information for use in calculating the optimum write power Pw_opt from the optimum write power intercept Pint_opt, and/or information for use in evaluating the quality of trial writing data, which are for use in write power adjustment of the present invention, are recorded on the control area of the optical disc and/or stored in the storage section of the optical disc apparatus. FIG. 12 is a view showing a control area 101 of the optical disc and a DI (Disc Information) 102 which is information included in the control area. The information acquired in advance and used in the write power adjustment method of the present invention is recorded on the DI information 102. When the information acquired in advance and used in the write power adjustment method of the present invention is stored in the optical disc apparatus, the information is stored in the storage section shown in FIG. 7.

This information may be recorded on the control area of the optical disc and/or stored in the storage section of the optical disc apparatus not as information directly used in the above-described use methods but as information which can be used in the same way as in the foregoing description with the calculation methods acquired in advance. The constants acquired in advance may also be recorded on the control area of the optical disc and/or stored in the storage section of the optical disc apparatus. For example, the ratio $\tau$ between the reference write power intercept Pint_ref and the reference asymptotic write power Pasy_ref for use in fitting the measured modulation characteristic in Embodiment 5 may not directly be acquired from the control information of the optical disc and/or the storage section of the optical disc apparatus but be calculated, for example, with $\tau$=Pint_ref/Pasy_ref by acquiring the reference write power intercept Pint_ref and the reference asymptotic write power Pasy_ref.

The method of the present embodiment is also applicable to subsequent embodiments, and similar effects can be obtained in each of the embodiments.

Embodiment 13

In the present embodiment, a description will be given of a method for applying the method for fitting the relation between the write power and the modulation by Formula (1), which is used in Embodiments 1 to 12, to the $\kappa$ model to thereby implement the $\kappa$ model with enhanced precision.

In this method, in addition to the specified write power Pind and the ratio $\rho$=Pw_opt/Ptarget_opt between the optimal target write power Ptarget_opt and the optimum write power Pw_opt, which are parameters for use in the $\kappa$ model, a reference asymptotic write power Pasy_ref, a reference write power intercept Pint_ref, and a ratio $\tau'$=Pint_ref/Ptarget_opt between Ptarget_opt and the reference write power intercept Pint_ref are used. These parameters are acquired in advance before execution of write power adjustment. In this case, values of Pind, ρ, Pasy_ref, Pint_ref, and τ' are calculated based on the same reference modulation characteristic in the optical disc.

Figure 13:
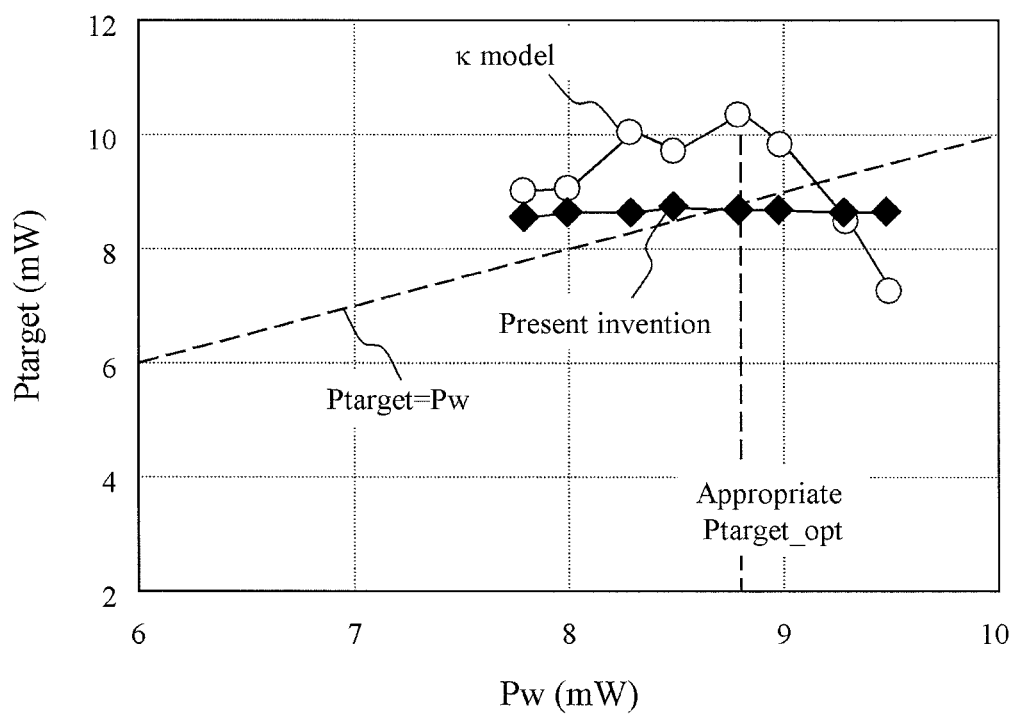
FIG. 13 is an exemplary view showing comparison between a relation of Pw versus Ptarget obtained by the κ-model write power adjustment and a relation of Pw versus Ptarget obtained by the write power adjustment method of the present invention with use of the reference asymptotic write power Pasy_ref and the reference write power intercept Pint_ref when other layers of the multilayered optical disc are in the unrecorded/recorded mixed states.

Write powers Pw[m] of a plurality of kinds are set in a write power range of about ±10% with Pind as a center. A random pattern with a specified length is recorded at each write power. Then the recorded signal is reproduced to acquire a modulation M[m] corresponding to the write power Pw[m]. The fitting described, for example, in Embodiment 4 is applied to the range of ±3% with the write power Pw[m] as a center, and the calculated optimum write power intercept Pint_opt[m] is multiplied by τ' to calculate a target write power Ptarget[m]. A relation between a central value Pw[m] of the range in which the fitting is performed and the calculated Ptarget[m] is shown in FIG. 13. Together with the relation, the result obtained by calculating Ptarget[m] by using the general κ model in every write power range in the same way as in the above description is also shown in the drawing. The optimal target write power Ptarget_opt is given as an intersection between a data curve of FIG. 13 and Ptarget=Pw. As compared with the Ptarget_opt value calculated in the present invention, the Ptarget_opt value calculated in the κ model has a deformed data curve, which indicates that wrong values are calculated. This is because the κ model is susceptible to the influence of partial variations of the modulation characteristic. Since Ptarget[m] of the present invention is a constant value independent of the write power Pw[m], high-precision fitting of the modulation characteristic can be achieved. It is appreciated, therefore, that an average value of Ptarget[m] is sufficient as the Ptarget_opt to be calculated. Ptarget_opt is calculated as an average value of Ptarget[m], and Ptarget_opt is multiplied by the coefficient ρ to calculate the optimum write power Pw_opt.

As described above, it can be confirmed that applying the present invention to the κ model can facilitate calculation of the optimal target write power Ptarget_opt in the κ model and the optimum write power Pw_opt can be determined with further high precision.

Although the method described in Embodiment 4 is used for fitting the modulation characteristic in the present embodiment, any methods for fitting the relation between the write power Pw[m] and the modulation M[m] described in this description may be used. The method of the present embodiment is also applicable to subsequent embodiments, and similar effects can be obtained in each of the embodiments.

Embodiment 14

In the present embodiment, a description will be given of the case where the evaluation index for use in obtaining the optimum values of the parameters which are used in fitting the relation between the write power Pw and the modulation M by Formula (1) in Embodiments 1 to 13 is changed, and more particularly, a description will be given of the case where the evaluation index for use in determining the optimum values of the parameters based on the relation between the write power Pw[m] versus evaluation value M[m]×(Pw[m]−Pasy) relation and the approximation straight line is changed. Since unchanged portions of the embodiment are similar to those in Embodiments 1 to 13, the description thereof will be omitted in the present embodiment.

As the evaluation index, the sum of distances between the write power Pw[m] versus evaluation value M[m]×(Pw[m]−Pasy) relation and the approximation straight line, the sum of errors, a standard error σ of errors, a correlation coefficient r between trial writing and the evaluation value of the approximation straight line, a determination coefficient R2 and the like may be used.

As long as the same index is used, the precision of write power adjustment is not degraded no matter which index is used. Therefore, as long as the index is pre-determined, any index may be used for evaluating the error.

The method of the present embodiment is also applicable to subsequent embodiments, and similar effects can be obtained in each of the embodiments.

Embodiment 15

In the present embodiment, a description will be given of the case where the precision of write power adjustment is enhanced by adding evaluation of approximation accuracy of Formula (1) with respect to trial writing data, i.e., evaluation of trial writing data quality in the write power adjustment in Embodiments 1 to 14. Since unchanged portions of the embodiment are similar to those in respective embodiments, the description thereof will be omitted in this embodiment. In the present embodiment, however, an optical disc is used which notably exhibits variations in modulation represented by FIG. 1, so that the effect of the present embodiment may easily be confirmed.

Evaluation of the quality of trial writing data is performed with use of the result obtained by fitting the trial writing data by Formula (1). First, a relation between the write power Pw[m] and the modulation M[m] in trial writing is fitted by, for example, the method of Embodiment 6.

For the measurement point (Pw[m], M[m]) obtained by trial writing, an evaluation value M[m]×(Pw[m]−Pasy) having the asymptotic write power Pasy as a variable is calculated. A relation between the write power Pw[m] and the evaluation value M[m]×(Pw[m]−Pasy) is subjected to linear approximation by the following Formula (7) which is configured by multiplying both the sides of Formula (1) by (Pw−Pasy).

[Expression 6]

$$M \times (Pw - Pasy) = Masy \times (Pw - Pint) \qquad (7)$$

As a consequence, Masy can be obtained as an inclination of Approximation Straight Line Formula (7), and Pint can be obtained as a Pw intercept of Approximation Straight Line Formula (7). These parameters Masy and Pint are also values having Pasy as a variable. An error between (Pw[m], M[m]×(Pw[m]−Pasy)) and Approximation Straight Line Formula (7) is expressed, for example, as the sum of errors in an evaluation value direction by Formula (3). When S in Error Sum Formula (3) is minimized, it becomes possible to most appropriately express (Pw[m], M[m]×(Pw[m]−Pasy)) by Formula (7). Accordingly, Pasy which minimizes S in Formula (3) is determined as an optimal asymptotic write power Pasy_opt. With the Pasy_opt, Masy is determined as an optimal asymptotic modulation Masy_opt and Pint is determined as an optimum write power intercept Pint_opt.

The optimum values Masy_opt, Pint_opt, and Pasy_opt of the parameters in Formula (1) are thus-provided, and based on these parameters, the optimum write power Pw_opt is calculated according to each embodiment. The reliability of the calculated Pw_opt depends on the quality of trial writing data. Accordingly, evaluation of the quality of trial writing data is performed hereinafter.

In quality evaluation, the amount of variations in trial writing data is estimated by, for example, comparing trial writing data with Approximation Formula (1) and thereby it is determined whether or not trial writing is appropriately performed. In the present embodiment, variation in a modulation direction is estimated and evaluated for example. Examples of the index indicating a correlation between the modulation M[m] in trial writing and the modulation (Pw[m]) M in Formula (1) include an error, a standard deviation 6, a correlation coefficient r, and a determination coefficient R2. In the present embodiment, a square value r2 (Formula (8) below) of the correlation coefficient r (Formula (5) is used in the present embodiment out of Formula (5) and Formula (6)) is used for example.

[Expression 7]

$$r^2 = \frac{\left\{n \sum_{m=1}^{n} \{M[m] \times M(Pw[m])\} - \left(\sum_{m=1}^{n} M[m]\right) \times \left(\sum_{m=1}^{n} M(Pw[m])\right)\right\}^2}{\left(n \sum_{m=1}^{n} (M[m])^2 - \left(\sum_{m=1}^{n} M[m]\right)^2\right)\left(n \sum_{m=1}^{n} \{M(Pw[m])\}^2 - \left(\sum_{m=1}^{n} M(Pw[m])\right)^2\right)} \quad (8)$$

In Expression 7, n represents the number of measurement points for use in evaluation, M[m] represents the modulation in trial writing, and M(Pw[m]) represents the modulation of Formula (1) calculated based on the result obtained by substituting Masy_opt, Pint_opt, and Pasy_opt, which are determined by the aforementioned method, into Formula (1).

Figure 14:
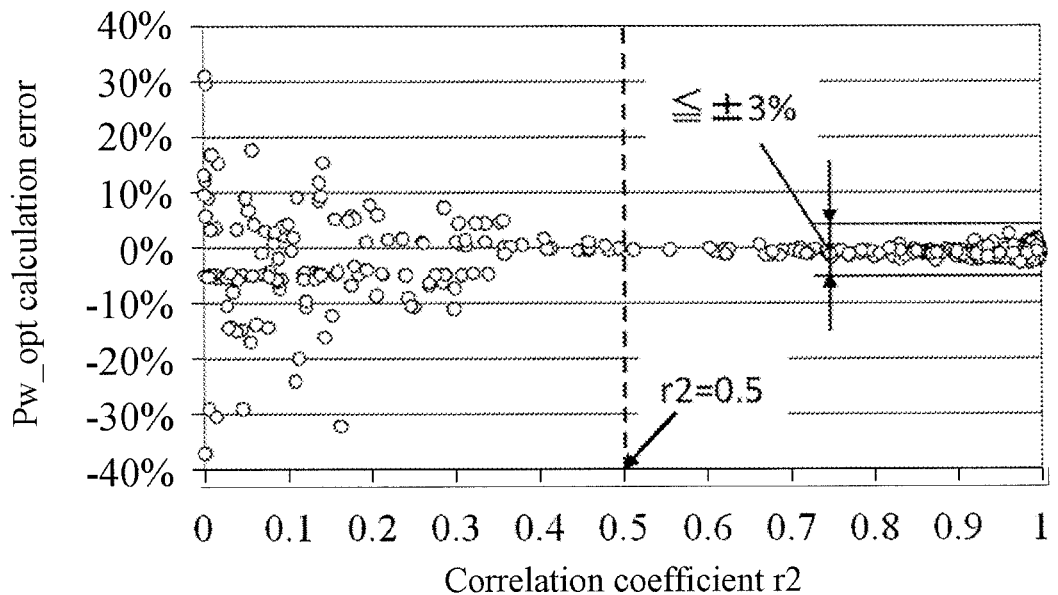
FIG. 14 is an exemplary view showing distribution of relations among an optimum write power Pw_opt calculated in each trial writing, trial writing data and a correlation coefficient r2 of the modulation in Approximation Formula (1).

FIG. 14 shows the result obtained by calculating the optimum write power Pw_opt and the correlation coefficient r2 when the trial writing is performed one thousand times and plotting the relation of (r2, Pw_opt) of each trial writing. In the trial writing with r2 being 0.5 or more, optimum write power is calculated with high precision with the calculation error of Pw_opt being ±3% or less. However, in the trail writing in which r2 is small, the calculation error spreads up to ±40%. This indicates the possibility that the optimum write power may be calculated inappropriately.

Generally, the value of the correlation coefficient r2 and the correlation has the following relation.

| | |
|---|---|
| 0.00 to 0.04 | generally no correlation is present |
| 0.04 to 0.16 | slight correlation is present |
| 0.16 to 0.49 | fair amount of correlation is present |
| 0.49 to 1.00 | strong correlation is present |

Therefore, it can be ensured that trial writing data is appropriate and that the optimum write power Pw_opt calculated based on the data is appropriate only when the strong correlation is present between the modulation M[m] in trial writing and the modulation M (Pw[m]) in Formula (1). In view of the above description, in the trial writing with r2 being less than 0.5, it is concluded that variation in trial writing data is large and so the optimum write power Pw_opt calculated therefrom is low in reliability. It is decided, therefore, that the write power adjustment is redone from the step of trial writing.

Figure 15:
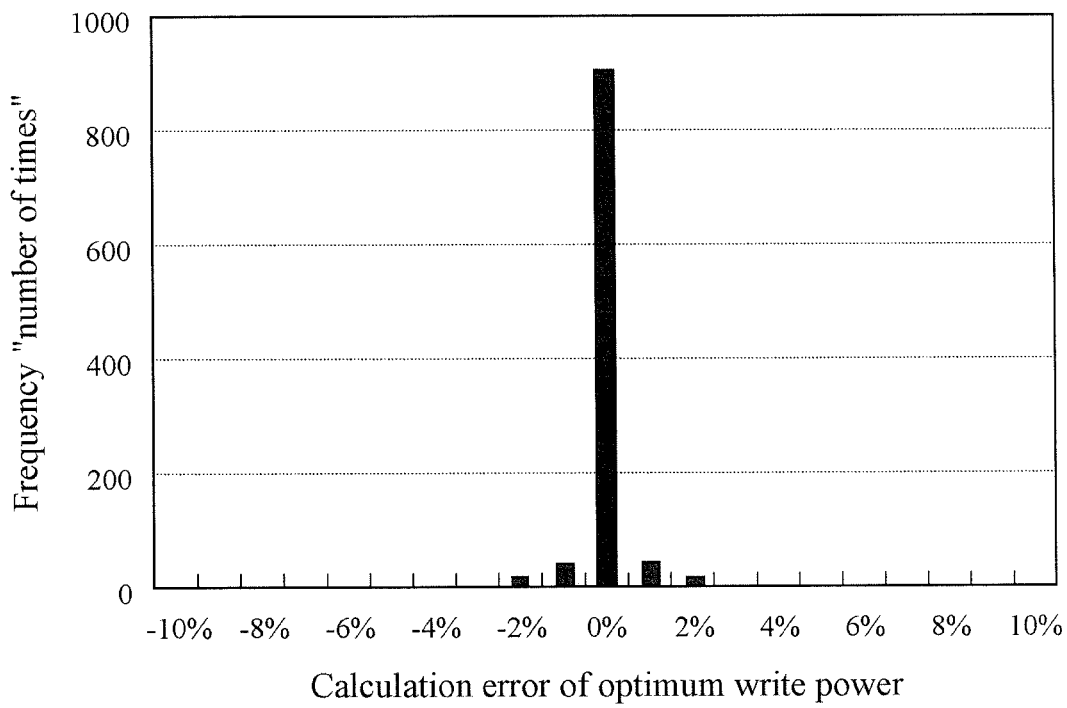
FIG. 15 is an exemplary view showing a relation between calculated optimum write power error and frequency when write power adjustment in Embodiment 15 of the present invention is performed one thousand times in the optical disc whose modulation characteristic varies.

FIG. 15 shows a relation between the calculation error of the optimum write power and the frequency when the write power adjustment is performed one thousand times with the above method. It can be confirmed that write power adjustment with very high precision can be implemented by adding the method for evaluating the quality of trial writing data to the write power adjustment.

In the present embodiment, the correlation between the modulation M[m] in trial writing and the modulation M (Pw[m]) in Formula (1) is evaluated with the square value r2 of the correlation coefficient. However, the correlation may be evaluated with such indexes as the sum of errors, a standard deviation σ of errors, a correlation coefficient r with use of Formula (6) and a determination coefficient R2. In these cases, a threshold of the index which ensures the adequacy of the trial writing data needs to be set for every index. In any of the cases, it is possible to enhance the precision of the write power adjustment in the same way as in the present embodiment.

In the present embodiment, the modulation M[m] in trial writing and the modulation M (Pw[m]) in Formula (1) are used in the comparison between the trial writing data and Approximation Formula (1). However, it is also possible to use, for example, an evaluation value M[m]×(Pw[m]−Pasy_opt) calculated based on the trial writing data and an evaluation value Masy_opt×(Pw[m]−Pint_opt) of Formula (7). However, these evaluation values are evaluation indexes for use in fitting according to the present embodiment, and the correlation of these evaluation values is the highest (with a small error) because of the execution of the fitting. Therefore, even if the calculated optimum write power Pw_opt is inadequate, the correlation between the trial writing and the evaluation value of Formula (7) becomes high. As a result, evaluation of the quality of trial writing data may not appropriately be performed. Meanwhile in the present embodiment, the evaluation value is used for fitting while the modulation is used for evaluating the quality of trial writing data, and so the evaluation indexes are changed. Thus, in the present embodiment, fitting is performed on two forms of Formula (1) (Formula (1) and Formula (7)) by changing the index, and thereby the precision of fitting is confirmed. Consequently, when the trial writing data fits with Formula (1), i.e., when the trial writing data is appropriate for write power adjustment for example, the result of fitting, which is performed on one of two forms of Formula (1), also imparts a high correlation to the index of the other form. As a result, it becomes possible to confirm that the trial writing data is appropriate. On the contrary, when the trial writing data does not fit with Formula (1), i.e., when the trial writing data is inadequate for write power adjustment, the result of fitting, which is performed on one of two forms of Formula (1), imparts a low correlation to the index of the other form. As a result, it becomes possible to confirm that the trial writing data is inappropriate. Therefore, the index different from the index used in fitting is used for evaluation of the quality of trial writing data, and thereby the precision of write power adjustment is further enhanced.

The method of the present embodiment is applicable to all the cases relating to write power adjustment in which the relation between the write power Pw and the modulation M is fitted by Formula (1).

It should be understood that the above-stated embodiments are merely a part of embodiments according to the present invention. The embodiments according to the present invention are not limited to the above-described embodiments. When principal components of the present invention are employed and embodied, similar effects may be obtained even though there is a difference in details.

REFERENCE SIGNS LIST

10: Optical disc,
12: Spindle motor,
14: Optical Pickup section
16: Laser beam,
18: Encoder,
20: LD driving section,
22: Control section,
24: RF signal processing section
26: Decoder,
28: Henv/Lenv acquisition section
100: Optical disc,
101: Control area,
102: ID (Disc Information),
103: Deficiency management information,
104: Trial writing area

The invention claimed is:

1. An evaluation method, comprising the steps of:
fitting a relation between write powers Pw[m] (m being an integer) of a plurality of kinds and a modulation M[m] obtained from a reproduction signal amplitude of a signal subjected to trial writing by a modulation characteristic formula M=Masy×(1−(Pint−Pasy)/(Pw−Pasy)) having an asymptotic modulation Masy, a write power intercept Pint, and an asymptotic write power Pasy as parameters to determine Masy_opt as an optimal value of the asymptotic modulation, Pint_opt as a optimal value of the write power intercept, and Pasy_opt as an optimal value of the asymptotic write power so as to minimize S:

$$S = \sum_m \{M[m] \times (Pw[m] - Pasy) - Masy \times (Pw[m] - Pint)\}^2;$$

calculating a square of a correlation coefficient r between M (Pw[m]) obtained by substituting the Pw[m] into the modulation characteristic formula using the Masy_opt, the Pint_opt, and the Pasy_opt and the modulation M[m] obtained from the trial writing; and
evaluating whether or not the relation between the write powers Pw[m] and the modulation M[m] is appropriate for write power adjustment with use of the square of a correlation coefficient r and a predetermined value.

2. The evaluation method according to claim 1, wherein the correlation coefficient r is calculated by the following expression:

$$r^2 = \frac{\left\{n \sum_{m=1}^{n} \{M[m] \times M(Pw[m])\} - \left(\sum_{m=1}^{n} M[m]\right) \times \left(\sum_{m=1}^{n} M(Pw[m])\right)\right\}^2}{\left(n \sum_{m=1}^{n} (M[m])^2 - \left(\sum_{m=1}^{n} M[m]\right)^2\right) \left(n \sum_{m=1}^{n} \{M(Pw[m])\}^2 - \left(\sum_{m=1}^{n} M(Pw[m])\right)^2\right)}.$$

3. An information recording method, comprising the steps of:
fitting a relation between write powers Pw[m] (m being an integer) of a plurality of kinds and a modulation M[m] obtained from a reproduction signal amplitude of a signal subjected to trial writing by a modulation characteristic formula M=Masy×(1−(Pint−Pasy)/(Pw−Pasy)) having an asymptotic modulation Masy, a write power intercept Pint, and an asymptotic write power Pasy as parameters to determine Masy_opt as an optimal value of the asymptotic modulation, Pint_opt as an optimal value of the write power intercept, and Pasy_opt as an optimal value of the asymptotic write power so as to minimize S:

$$S = \sum_m \{M[m] \times (Pw[m] - Pasy) - Masy \times (Pw[m] - Pint)\}^2;$$

calculating a square of a correlation coefficient r between M (Pw[m]) obtained by substituting the Pw[m] into the modulation characteristic formula using the Masy_opt, the Pint_opt, and the Pasy_opt and the modulation M[m] obtained from the trial writing;
evaluating whether or not the relation between the write powers Pw[m] and the modulation M[m] is appropriate for write power adjustment with use of the square of a correlation coefficient r and a predetermined value; and
recording information with write waveforms having the write powers after the evaluation.

* * * * *